(12) United States Patent
Noel

(10) Patent No.: US 10,690,633 B2
(45) Date of Patent: Jun. 23, 2020

(54) TOOLS FOR THE CALIBRATION OF AN ULTRASOUND INSPECTION DEVICE

(71) Applicant: VALLOUREC TUBES FRANCE, Boulogne-Billancourt (FR)

(72) Inventor: Alexandre Noel, Gommegnies (FR)

(73) Assignee: VALLOUREC TUBES FRANCE, Boulogne-Billancourt (FR)

( * ) Notice: Subject to any disclaimer, the term of this patent is extended or adjusted under 35 U.S.C. 154(b) by 374 days.

(21) Appl. No.: 15/562,665

(22) PCT Filed: Mar. 25, 2016

(86) PCT No.: PCT/EP2016/056698
§ 371 (c)(1),
(2) Date: Sep. 28, 2017

(87) PCT Pub. No.: WO2016/156262
PCT Pub. Date: Oct. 6, 2016

(65) Prior Publication Data
US 2018/0106768 A1    Apr. 19, 2018

(30) Foreign Application Priority Data
Mar. 31, 2015 (FR) .................................... 15 52770

(51) Int. Cl.
*G01N 29/30* (2006.01)
*G01N 29/44* (2006.01)
*G01N 29/48* (2006.01)

(52) U.S. Cl.
CPC .......... *G01N 29/30* (2013.01); *G01N 29/449* (2013.01); *G01N 29/4463* (2013.01); *G01N 29/48* (2013.01); *G01N 2291/044* (2013.01)

(58) Field of Classification Search
CPC ...................................................... G01N 29/30
USPC ......................................................... 73/1.82
See application file for complete search history.

(56) References Cited

U.S. PATENT DOCUMENTS

| | | | |
|---|---|---|---|
| 4,757,716 A * | 7/1988 | Nottingham ........ | F01D 21/003 73/623 |
| 2007/0186655 A1* | 8/2007 | Reed .................. | G01N 15/088 73/620 |
| 2017/0284972 A1* | 10/2017 | Lepage ............... | G01N 29/043 |

OTHER PUBLICATIONS

International Search Report dated Jun. 8, 2016, in PCT/EP2016/056698, filed Mar. 25, 2016.

* cited by examiner

*Primary Examiner* — Walter L Lindsay, Jr.
*Assistant Examiner* — Philipmarcus T Fadul
(74) *Attorney, Agent, or Firm* — Oblon, McClelland, Maier & Neustadt, L.L.P.

(57) ABSTRACT

A module to help in calibration of a device for inspection of metallurgical products including a memory configured to store data in a form of value/angle pairs. Each pair corresponds to an amplitude of response to an ultrasound inspection in a direction of the metallurgical product corresponding to the angle. A calculator is configured to perform a processing function on the stored data. A first set of data involves a polydirectional reflector disposed in the metallurgical product. A second set of data involves a directional reflector disposed in the metallurgical product. The processing function establishes a third set of data by interpolation of pairs of the first set of data and the second set of data. The pairs of the third set correspond to standard amplitudes for ultrasound inspections along at least some of the working directions of the polydirectional reflector.

13 Claims, 12 Drawing Sheets

TOOLS FOR THE CALIBRATION OF AN ULTRASOUND INSPECTION DEVICE

The invention concerns the field of nondestructive inspection of metallurgical products, particularly profiled sections of significant length, typically between several meters and several dozen meters.

To better understand the invention, it is described in the context of generally tubular products, especially pipes, as examples of metallurgical products. Even so, the invention is meant to have a broader application.

Pipes of large length are in widespread use. As areas of application one can mention, for example, electrical production, where one uses so-called "boiler" pipes, petroleum and gas, where one uses pipes for drilling, extraction and transport ("line pipes"), or mechanical construction, whether civil engineering or the automotive and aircraft industries.

Like the majority of metallurgical products, pipes are liable to have defects related to their fabrication, such as inclusions of material in the steel or absences of material, for example. In general, any heterogeneity in the steel matrix is seen as an imperfection which is liable to impair the mechanical strength of the pipe in service.

That is why one inspects the metal pipes right after their fabrication, not only to detect any faults there, but also, if applicable, to determine information which is useful to evaluating the danger level of these faults, especially their size, their depth, their position, their nature, or even their orientation.

When fabricating a lot of pipes it is desirable to inspect the largest number of them, and in the most certain manner. Some operators in the industry, like the applicant, individually check each pipe produced.

Hence, the inspection of a pipe is one stage in its fabrication, like the other more classical ones, especially the shaping.

Because they affect the production rhythm, the inspection methods used must be economical and quick, while still being reliable. One would like to have practically automatic inspection methods.

In particular, one will use inspection techniques involving ultrasound waves. The ultrasound waves are made to propagate in the pipe being inspected, and among the resulting echoes one looks for those not related to the geometry of the pipe. Inclusions or absences of material constitute variations within the medium of propagation of the wave, and therefore generate echoes when struck by ultrasound waves. These variations can be viewed as imperfections.

The intensity of the echo produced by an imperfection depends on the angle at which the wave strikes it. For one direction of propagation of the ultrasound wave in the pipe, one detects primarily the imperfections oriented in corresponding manner, that is, perpendicular to the direction of propagation, but with a certain tolerance, on the order of one or two degrees.

In practice, the imperfections are not purely longitudinal or transverse, but send out a more or less substantial echo in one or the other of these directions. The orientation of an imperfection can be likened to its largest surface of reflection.

An imperfection returning an echo of amplitude greater than a threshold value is known as a defect. One generally associates with this defect an orientation value, which can be deduced from the inspection direction.

For example, in the art, any imperfection which generates, in response to a corresponding orientation shot, an echo with amplitude greater than a predefined value is called a longitudinal defect. This threshold value is set by calibration. Classically, one uses as reference defects, or standard defects, notches of known, most often standardized position (depth and orientation) and dimensions, which have been made in a sample pipe.

The duration of the inspection depends primarily on the time needed for the ultrasound waves to travel in the pipe, back and forth, and to a certain extent on the time for the processing of the return signals recorded.

To reconcile the needs of production rhythm and safety, it has become the custom to limit the number of ultrasound shots and to only look for defects having certain particular orientations in each pipe.

Classically, one wants to detect the most frequent defects, generally the defects oriented parallel to the generatrix of the pipe.

Recent developments in the art involve inspection methods which further enable the detection of defects of different orientation, while still limiting the number of shots to maintain an acceptable inspection rhythm.

For example, one knows from WO 2003/50527 a nondestructive inspection layout for metallurgical products in which one uses a one-dimensional sensor of "phased array" type. Each transducer element is excited one time and then a processing circuit analyzes the overall response of the pipe to this single emission, which is known as a "shot" in the art. Based on a shot carried out in the transverse direction of the pipe, one is able to determine the presence not only of defects disposed perpendicular to this direction, but also defects having an inclination with respect to this perpendicular direction between plus and minus 20°.

In practice, one uses three sensors: two sensors devoted to the detecting of defects oriented longitudinally or having an inclination with respect to this longitudinal direction between plus and minus 20°, and one supplemental sensor to detect defects which are oriented transversely to the pipe and/or to measure the thickness of the pipe.

One also knows from FR 3 000 212, in the name of the applicant, an ultrasound inspection device able to inspect a metallurgical product by detecting defects of any orientation in it. The device in question uses a single sensor, excited a reduced number of times, which allows one to maintain a good inspection rhythm.

In particular, it is possible to detect, with the help of this single sensor and a limited number of shots, transverse defects, also known as "circumferential defects", that is, defects extending perpendicular to the generatrix of the pipe, longitudinal defects, which extend along this generatrix, and defects making any given angle with the generatrix of the pipe being inspected. The gain in productivity and reliability is obvious.

Inspecting pipes for the existence of defects of multiple orientations, or any given orientation, involves studying the response of a pipe to ultrasound waves propagating along respective directions different from each other, so as to cover all possible orientations.

This greatly complicates the calibration of the inspection device, at least because a threshold value needs to be adjusted for each direction inspected, generally being the same one.

The number of standard defects, or notches, to be made in the sample pipe depends directly on the number of directions inspected: in the absence of symmetry for these directions, one theoretically needs to have as many notches as there are directions inspected, while mutually symmetrical directions of inspection make it possible to use a single notch to calibrate an inspection device along two directions of inspection.

Even so, inspecting pipes to find defects of any given orientation at present requires a sample pipe having many notches, which makes it difficult to fabricate and thus very costly. As an example, one uses today a sample pipe having seventy-two notches, namely, thirty-six notches on the outer surface of the pipe, regularly inclined with respect to the generatrix of the pipe, and as many on the inner surface. Moreover, the more notches the longer and more complex the calibration, especially because of the manual operations needed, such as the positioning of the sensor with respect to the notches, for example.

The invention proposes to improve the situation.

A module is proposed to help in the calibration of a device for inspection of metallurgical products comprising memory capable of storing data in the form of value/angle pairs, each pair corresponding to an amplitude of response to an ultrasound inspection in a direction of the metallurgical product corresponding to said angle, and a calculator able to perform a processing function on the stored data. The data are organized into a first set of data involving a polydirectional reflector disposed in the metallurgical product, the pairs of the first set corresponding to amplitudes of response to ultrasound inspections along at least some of the working directions of the polydirectional reflector, and a second set of data involving a directional reflector disposed in the metallurgical product, the second set of data comprising, for the directional reflector, at least one pair corresponding to an amplitude of response to an ultrasound inspection along one working direction of the reflector. The processing function is disposed to establish a third set of data by interpolation of pairs of the first set of data and the second set of data, the pairs of the third set corresponding to standard amplitudes for ultrasound inspections along at least some of the working directions of the polydirectional reflector.

The proposed module utilizes data measured for ultrasound inspections performed on a polydirectional reflector and on one or more directional reflectors. It uses fewer directional reflectors than there are directions being calibrated: the directions of inspection which do not correspond to any working direction of a directional reflector are calibrated with the aid of amplitudes measured with the polydirectional reflector, for a corresponding working direction. This makes it possible to use the directional reflectors, in particular notches, as standard defects whose geometrical characteristics may possibly be the subject of a specification, while still reducing their number. This makes it possible to use one or more standard defects regardless of their orientation in the pipe to calibrate a plurality of directions of inspection.

There is also proposed a method to aid in the calibration of an inspection device for metallurgical products. The method involves the following steps:

saving a first set of data in the form of value/angle pairs, the first set of data concerning a polydirectional reflector disposed in the metallurgical product, the value/angle pairs of the first set of data corresponding to amplitudes of response to ultrasound inspections along at least some of the working directions of the polydirectional reflector corresponding to said angle, saving a second set of data in the form of value/angle pairs, the second set of data concerning a directional reflector disposed in the metallurgical product, the second set of data comprising, for the directional reflector, at least one value/angle pair corresponding to an amplitude of response to an ultrasound inspection along one working direction of the reflector corresponding to said angle, establishing a third set of data, in the form of value/angle pairs, by interpolation of the pairs of the first set of data and the second set of data, the pairs of the third set corresponding to standard amplitudes for ultrasound inspections along at least some of the working directions of the polydirectional reflector.

Finally, a computer program module is proposed which is able to cooperate with a calculation unit to constitute the module proposed above.

Other characteristics and advantages of the invention will appear from perusal of the following detailed description, and the appended drawings, in which.

The drawings and the annexes contain elements of a definite attribute. Thus, they can be used not only for the description but also the definition of the invention, if necessary.

Figure 2:
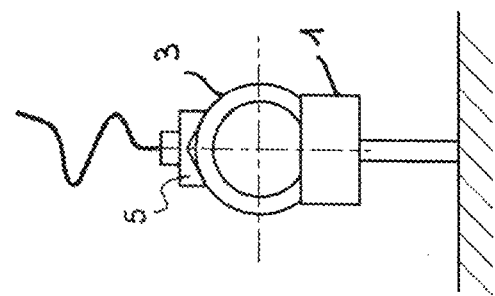
FIGS. 1 and 2 show an inspection layout for metallurgical products, respectively front and side view.
Figure 1:
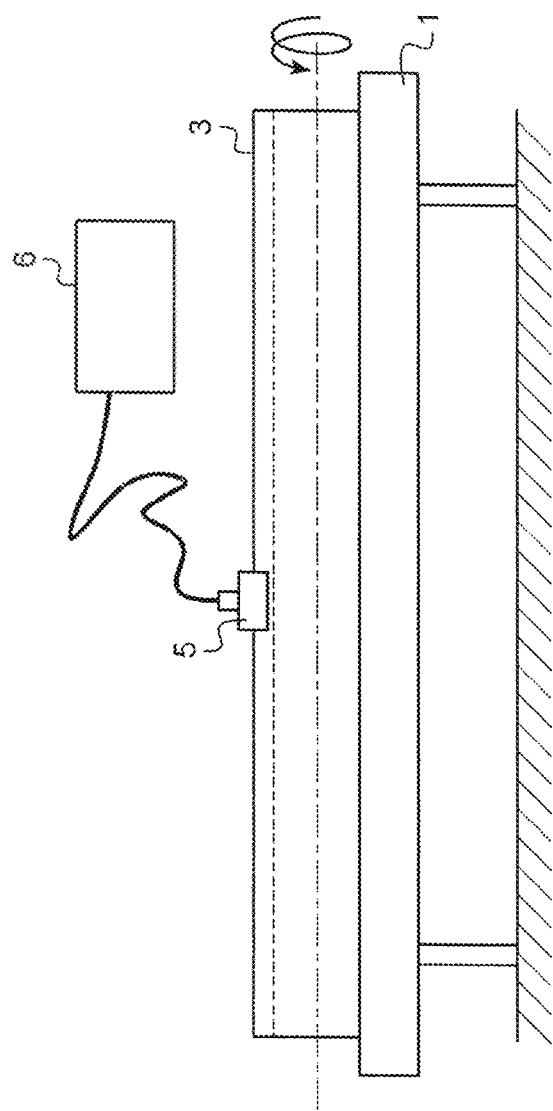

Refer now to FIGS. 1 and 2.

An inspection layout using ultrasound waves comprises a bench 1 supporting a metal pipe 3 being inspected and an ultrasound sensor 5, placed against the peripheral surface of the pipe 3, and connected to a control and processing electronics 6. The ultrasound sensor 5 is sometimes called a "transducer" in the art.

For the inspection, the sensor 5 and the pipe 3 are in relative helicoidal displacement. Here, the pipe 3 is displaced relative to the bench 1 in a helicoidal movement about an axis corresponding to its longitudinal axis, while the sensor 5 is maintained in its position relative to the bench 1. The bench 1 can be outfitted with rotatable rollers inclined relative to the longitudinal axis of the pipe 3.

As a variant, the pipe 3 can be provided with a rotational movement only with respect to the bench 1, while the sensor 5 slides in the longitudinal direction of the bench 1. The sensor 5 can be mounted on a cart which can move relative to the bench 1. In yet another variant, the sensor 5 can rotate about the pipe 3, while the latter is in translatory movement relative to the bench 1.

The relative helicoidal movement between the sensor 5 and the pipe 3 makes it possible to inspect the entire pipe 3 with the help of a sensor 5 of reduced size as compared to the circumference of the pipe 3. As a replacement, one could provide a larger number of sensors disposed in a crown around the pipe 3, and ensure a shot sequence which guarantees a coverage when the pipe 3 slides in relation to the sensor 5.

A coupling medium, or "coupant" in the art, can be placed between the sensor 5 and the peripheral surface of the pipe 3, for example in the form of a gel. In one variant, the layout can include a box filled with water, or any other liquid coupling medium, in which the pipe 3 and the sensor 5 are immersed.

The layout is intended to inspect the pipe 3 to verify the existence of defects with different orientations relative to each other, especially with any given orientation. The direction of an inspection corresponds to the orientation, in the pipe 3, of the defects being discovered.

To inspect the pipe 3 along different directions of inspection, one can perform several ultrasound shots: each ultrasound shot consists in generating ultrasound waves with the aid of the sensor 5, which are propagated in the pipe 3 primarily along a direction corresponding to the direction of inspection. One can also use a device of the type described in the French patent application FR 3 000 212, which device makes it possible to inspect the pipe along several different directions with a single ultrasound shot.

In order to be able to distinguish, in the responses of the pipe 3, the echoes resulting from defects and those resulting from imperfections, the inspection layout needs to be calibrated for each of the directions of inspection.

For example, the layout is intended to inspect the pipe 3 for the existence of defects of any given orientation by inspecting 72 directions regularly distributed over 360°: the directions of inspection are inclined relative to each other by an angle step of 5°.

Figure 3:
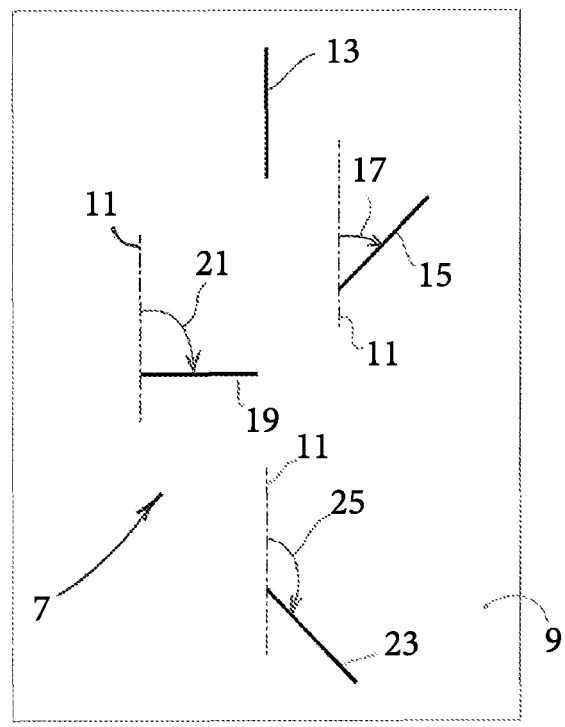
FIG. 3 shows standard defects of a first type in a sample pipe, seen from above.
Figure 4:
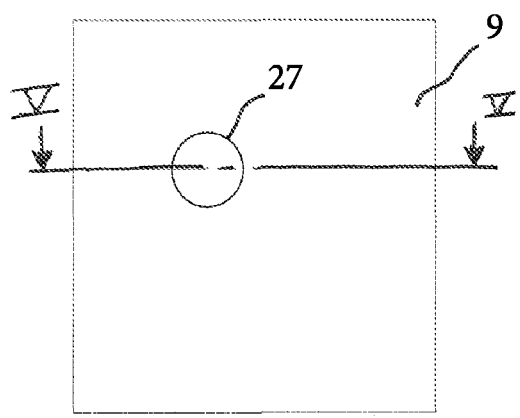
FIGS. 4 and 5 shows a standard defect of a second type in a sample pipe, top view and sectional view along line V-V, respectively.
Figure 5:
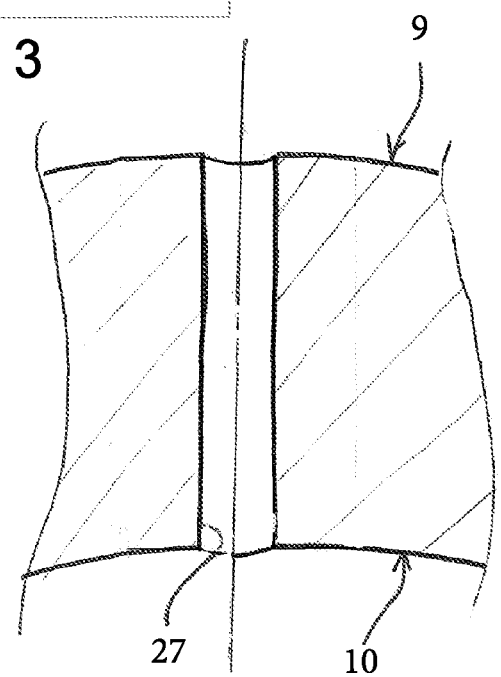

Now refer to FIGS. 3 to 5.

In order to calibrate an inspection layout for metallurgical products using ultrasound waves, such as the type described in regard to FIGS. 1 and 2, one uses the layout on a sample product, or reference product, here a pipe representative from the standpoint of the inspection of the products being inspected. For example, the sample pipe takes the place of the pipe 3 described in connection with FIGS. 1 and 2.

The sample pipe has values of diameter and thickness similar to a pipe model. The sample pipe can furthermore be made from the same material, or at least similar material, to that of the model, typically of the same grade of steel or a grade belonging to a same group of grades. In general, a pipe model is intended for a particular application, to which the material of the pipe and the heat treatment which it undergoes have been adapted. In particular, the sample pipe verifies the conditions set forth in section 6, entitled "Reference tube", of standard EN ISO 10893-10, especially sections 6.1.3 and 6.1.4, or the like.

In practice, one classically provides at least one sample pipe per application.

The sample pipe is provided with elongated notches of a first type, or first notches, designated altogether by the reference number 7. The elongated notches 7 are made in the wall of the sample pipe, from the outer surface 9 (external notches) or the inner surface 10 (internal notches) of the latter. Each of the first notches 7 has an respective orientation in the pipe. This orientation is defined, for example, with respect to a generatrix 11 of the sample pipe. The orientation of a notch can be defined by the inclination of its longitudinal axis with respect to the generatrix 11 of the sample pipe, in a plane tangent to the outer surface of the latter.

The respective orientations of the first notches 7 here are such that these notches 7 are regularly inclined with respect to each other so as to cover an angle range of around 180° in the sample pipe. The first notches 7 are regularly distributed in terms of angle so as to cover the particular angle sector, here 180°. The sample pipe has, for example, four exterior notches 7, oriented as follows:

- a first notch, or longitudinal notch 13, which extends along the generatrix 11 of the sample pipe, that is, whose angle of inclination Alpha_1 with respect to this generatrix is close to 0;
- a second notch, or first oblique notch 15, which extends along a direction inclined by an angle Alpha_2 17, here around 45°, with respect to the generatrix 11 of the sample pipe;
- a third notch, or transverse notch 19, extending perpendicularly to the generatrix 11 of the sample pipe, or by an angle Alpha_3 21 close to 90°; and
- a fourth notch, or second oblique notch 23, extending along a direction inclined by an angle Alpha_4 25, here around 135°, with respect to the generatrix 11 of the sample pipe.

With the exception of their respective orientation in the sample pipe, the first notches 7 are analogous to each other, especially as regards their depth, their transverse section and their length, which will simplify the calibration.

The dimensions of the first notches can be fixed by specifications, in particular those established by the pipe buyer. By default, as is the case here, the first notches 7 can be of the type described in the standard EN ISO 10893-10, especially its section 6, or the like.

The sample pipe is moreover provided with at least a first opening made in its wall and emerging onto the outer surface 9 or the inner surface 10 of the pipe. In depth, the first opening extends for at least 5% of the thickness of the pipe. The first opening here takes the form of a radial boring 27 of circular section. The radial boring 27 furthermore emerges here onto the inner surface 10 of the sample pipe.

The sample pipe can furthermore be provided with elongated notches of a second type (not represented), or second notches, made in the wall of this pipe and open onto the outer surface 9 or the inner surface 10 of the pipe, being the inverse of the first notches 7. The second notches can be analogous to the first notches 7, especially as regards their number, their respective orientation, their form and/or their length.

The sample pipe can furthermore have a supplemental opening, made in its wall and emerging onto the inner surface 10 or the outer surface 9, inversely to the first opening.

The supplemental opening extends in depth for at least 5% of the thickness of the sample pipe 7. The supplemental opening can coincide with the first opening, as is the case with the radial boring 27 shown in FIG. 5.

Figure 6:
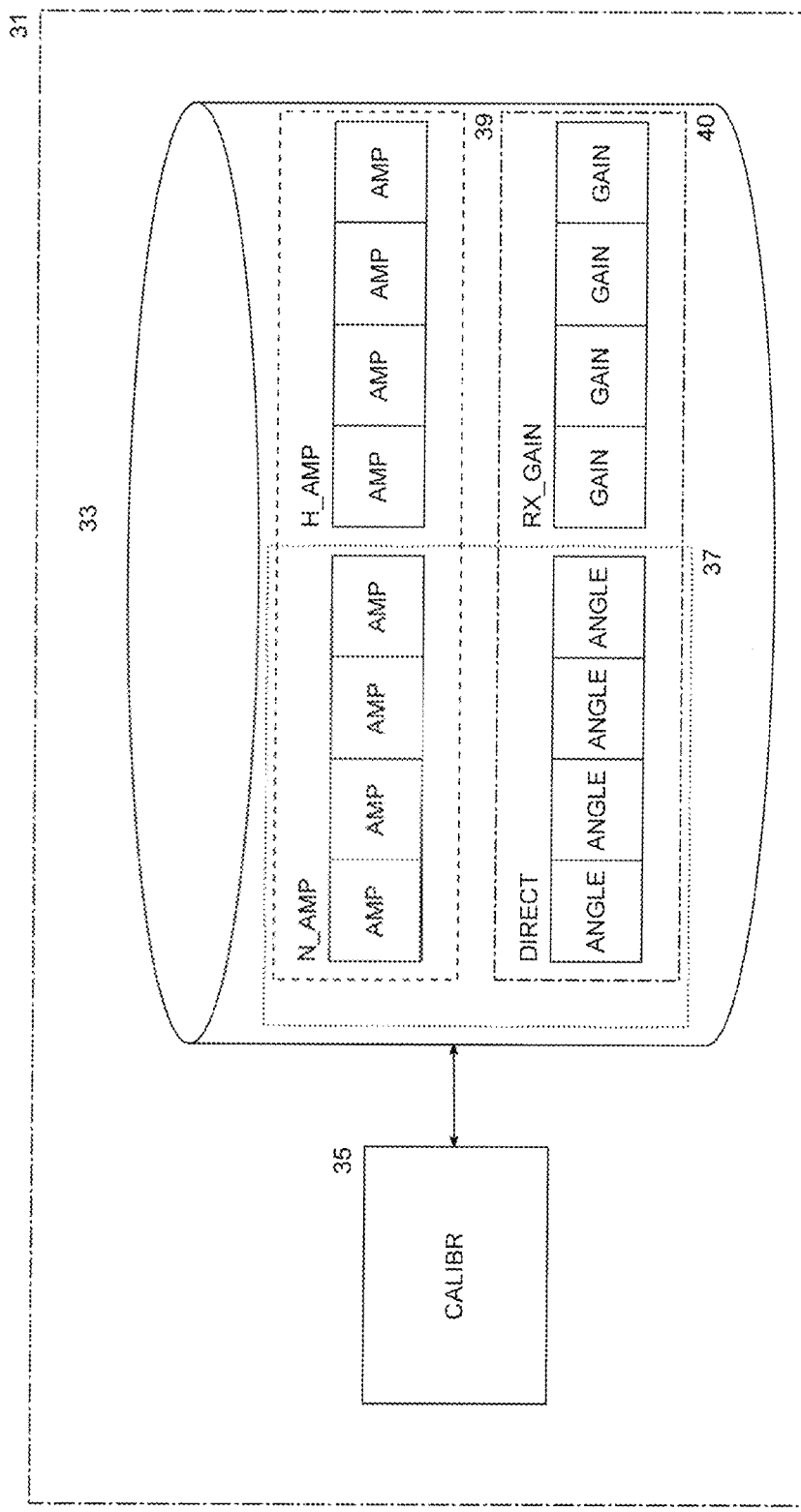
FIG. 6 shows schematically a module to help in the calibration of an inspection device for metallurgical products.

FIG. 6 shows a module 31 to help in the calibration, intended for an inspection layout of metallurgical products, such as the inspection layout 6 described in regard to FIGS. 1 and 2.

The module 31 comprises memory 33 organized to save the working data regarding at least one sample pipe, such as the sample pipe mentioned in regard to FIGS. 3 to 5. This working data includes in particular data resulting from ultrasound measurements taken with the inspection device being calibrated, such as the device 1 described in connection with FIGS. 1 and 2. The measurements in question are taken on a sample pipe in which ultrasound reflectors have been disposed.

The module 31 furthermore comprises a calculator which performs a processing function, or CALIBR function 35, which works on the data of the memory 33 in order to obtain data useful in the calibration of the inspection device. This useful data can be saved, at least temporarily, in the memory 33.

The memory 33 is organized so as to save at least some of the working data regarding the sample pipe in the form of value/angle pairs. Each pair designates an amplitude of reflection of an ultrasound wave associated with a directional parameter. The directional parameter corresponds to a direction of inspection, that is, a general direction of propagation of the beam of ultrasound waves in the pipe. The directional parameter comprises, for example, an angle value which characterizes the direction of inspection with respect to a common reference, such as an angle of inclination with respect to the generatrix of the sample pipe.

The memory 33 is organized so as to group together the value/angle pairs into sets of data, where each set of data characterizes the response, or the return, of a respective ultrasound reflector, or a group of respective ultrasound reflectors, to one or more ultrasound beams, perhaps directed differently with regard to the sample pipe. Each value/angle pair corresponds to an amplitude of the response of the ultrasound reflector to an inspection directed in accordance with the angle of the pair.

The memory 33 is organized so as to save at least a first set of data regarding a directional reflector, or a group of directional reflectors, here designated as UNISET data 37, and at least a second set of data regarding a polydirectional reflector, or OMNISET data 39.

A directional reflector responds to the ultrasound waves principally in one direction, or working direction. In other words, a unidirectional reflector is designed so as to respond to an ultrasound wave principally when the direction of propagation of the latter corresponds to the working direction of the directional reflector. Elongated notches disposed in a product, such as the notches 7 described in regard to FIG. 3, are examples of directional reflectors: each notch 7 responds principally to the ultrasound beams which strike it perpendicular to its longitudinal direction, along its working direction.

In practice, the totality of responses of a directional reflector to ultrasound inspections performed in different directions from each other has an amplitude value much larger than the other values, this greater value being obtained for a direction of inspection that corresponds to the working direction of the directional reflector in the pipe.

A polydirectional reflector responds in similar manner to ultrasound waves which strike it along many different directions. The amplitude of the response is close for most of the directions of inspection. An opening of circular section, particularly like the boring 27 described in regard to FIGS. 4 and 5, represents an example of a polydirectional reflector: the boring 27 responds essentially the same to all the ultrasound beams striking it perpendicular to its axis. Due to this fact, the boring 27 can also be seen as an omnidirectional opening.

The directional reflectors here, such as the notches 7 of FIG. 3, are oriented in the sample pipe such that their working direction corresponds to the direction of an inspection shot. The polydirectional reflector, such as the boring 27, is oriented in the sample pipe so that at least some of these working directions each correspond to a direction of a respective inspection shot. Preferably, the polydirectional reflector is designed and oriented in the sample pipe such that each direction of inspection corresponds to one of its working directions. This is the case, in particular, with an omnidirectional reflector of the boring type 27, for example.

The set UNISET 37 comprises, for each directional reflector, at least one value/angle pair corresponding to a return amplitude value of the reflector for an ultrasound shot directed in a manner corresponding to the working direction of the reflector in the sample pipe. Viewed otherwise, the value/angle pair corresponds to the response of a directional reflector oriented in the sample pipe such that its working direction corresponds to the direction of inspection as defined by the value of the angle.

The two left hand columns of Table 1.1 illustrate the content of a set of data of the type of the set UNISET 37 for four notches made on the inner surface of a sample pipe, and oriented such that their longitudinal direction is inclined respectively by 0, 45, 90 and 135 degrees with respect to the generatrix of this pipe. For example, this involves the notches 13, 15, 19 and 23 described in regard to FIG. 3. The data of the annexes correspond to a sample pipe of 231 millimeters diameter and 10 millimeters thickness. The amplitudes are expressed in relative manner, as a percentage. The initial gain is 35 decibels. The notches here are parallelepipeds with a U-shaped profile.

In each row, an amplitude value is relative to the response of a respective notch to an ultrasound inspection directed, with respect to the generatrix of the pipe, in a manner corresponding to the orientation of the notch in question in the pipe. Each row involves a direction of inspection corresponding to the working direction of a directional reflector. A notch has two major air/steel interfaces which form two directional reflectors, oriented symmetrically to each other. The two left hand columns of each row of Table 1.1 show one value/angle pair for one respective directional reflector. The rows corresponding to angles 45° and 225°, for example, concern the same notch, analogous to the notch 15 of FIG. 3.

The left hand column of Table 1.1 and the right hand column illustrate a supplemental, complementary or replacement content of the set of data UNISET 37 with regard to four notches devised in the outer surface of the sample pipe, and oriented analogously to the interior notches of the table. For example, this involves the notches 13, 15, 19 and 23 described in regard to FIG. 3.

The set OMNISET 39 comprises a plurality of value/angle pairs each corresponding to a return amplitude value of the polydirectional reflector for an ultrasound wave directed corresponding to a working direction, in the pipe, of the polydirectional reflector. Viewed otherwise, each value/angle pair corresponds to the response of the polydirectional reflector to a direction of inspection defined by the angle value, and corresponding to a working direction of this reflector.

The two left hand columns of Table 1.2 illustrate the content of a set of data of the type of the set OMNISET 37 for an opening of circular section extending radially in the thickness of the sample pipe, here, from the outer surface of the latter to its inner surface. The opening in question is of the type of the opening 27 described in regard to FIG. 4. The two columns in question concern more particularly the portion of the opening which is situated near the inner surface of the pipe. Hence, they can be seen as an example of OMNISET data for a polydirectional reflector disposed at the inner surface of the pipe. The left-hand column brings together the directions of inspection, likewise distributed over 360°, with a step of 5°.

On each row, an amplitude value is relative to the response of the opening to an ultrasound inspection directed, with regard to the generatrix of the pipe, in a manner corresponding to the angle indicated.

The left-hand column of the table in annex 1.2 and the right-hand one illustrate a supplemental, complementary or replacement content of the set of data OMNISET 39 relative to the portion of the opening extending near the outer surface of the pipe.

The UNISET 37 and OMNISET 39 data can be collected in respective tables of the memory 33. In this case, for example, each row of a respective table points to an angle, while the corresponding column points to a value.

The memory 33 is organized so as to save moreover the result, or calibration data regarding the sample pipe in the form of value/angle pairs. Each pair designates a reception gain associated with a directional parameter. The directional parameter corresponds to a direction of inspection being calibrated. The result data is collected here in a set of data, designated here the RESULSET 40.

In the sample embodiment of FIG. 6, the memory 33 keeps an indexed table of dimension N (natural whole number) which brings together the directions of inspection, or Table DIRECT[ ]. Each element of the Table DIRECT[ ] acts as a pointer to an angle, which defines a respective direction of inspection, for example, as an inclination with respect to the generatrix of the pipe in a plane tangent to the latter. Here, the number N of directions inspected, and the angles, correspond to the directions which will be inspected after the calibration, that is, the calibrated directions.

The data of the sets UNISET 37 and OMNISET 39 are collected in respective indexed tables, in particular, of the same dimension N as the Table DIRECT[ ]. For example, the set UNISET 37 comprises a table of amplitude N_AMP[ ] regarding the responses of directional reflectors, while the set OMNISET 39 comprises a table of amplitudes H_AMP[ ] regarding the responses of the polydirectional reflector. Each element of the tables N_AMP[ ] and H_AMP[ ] acts as a pointer to a value corresponding to the amplitude of the response of the particular reflector in a direction of inspection corresponding to the angle shared by the index value in the Table DIRECT[ ].

The RESULSET data 40 are collected in an indexed table of dimension N, here, a Table of gains RX_GAIN[ ], each element of which acts as a pointer to a value corresponding to the reception gain being regulated in a direction of inspection corresponding to the angle shared by the index value in the Table DIRECT[ ].

The CALIBR function 35 allows, as parameters, data defining a totality of directions of inspection, customary for inspection during the production phase. These are the directions to be calibrated. The data received may comprise a totality of angle values corresponding to directions of inspection, or an integer value as the number of directions to be inspected for an angle sector of predefined extent, such as 180°. The extent of the angle sector can also be used as a parameter for the CALIBR function 35.

Figure 7:
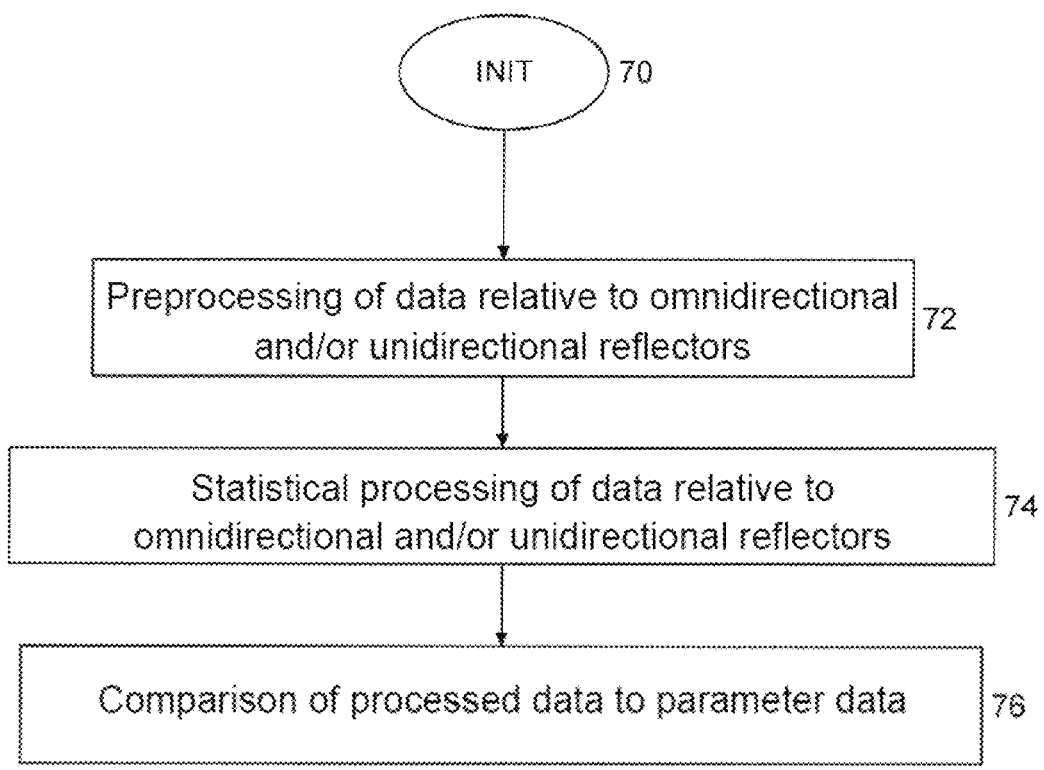
FIG. 7 shows a flow chart illustrating a calibration function which can be used in the module of FIG. 6.

FIG. 7 illustrates a sample embodiment of the CALIBR function 35.

One starts with an initialization step 70, during which the CALIBR function 35 receives at least some data useful to the definition of the parameters of the calibration.

These parameters comprise, in particular, an initial gain value, or IG value, that is, a nominal gain value to be used in reception during future ultrasound inspections, and a threshold (relative) amplitude value, or TG value, above which one distinguishes a defect from an imperfection. These parameters furthermore include a definition of the different directions being calibrated, that is, the directions of inspection to be used during the future inspections. If applicable, one will fill in a table, such as the kind of the Table of direction DIRECT[ ], and/or one will use data already found in such a table.

The gain values of the result data take on the nominal value IG, which is common to all the pairs, regardless of the angle value. For example, the nominal gain IG can be 11 decibels. If applicable, one will fill in each element of a table of the kind of Table RX_GAIN[ ] with this nominal value IG.

The data received can furthermore include ultrasound measurement data relative to a sample pipe, in particular the measurement data relative to one or more directional reflectors and a polydirectional reflector. These data are saved in memory in the form of sets of data, for example, of the kind of the sets of data UNISET 37 and OMNISET 39. If applicable, one will fill out tables of the kind of tables N_AMP[ ] and H_AMP[ ].

The initialization step 70 is followed by a preprocessing step 72 involving data relative to the directional and/or polydirectional reflectors, such as the data of the sets OMNISET 39 and UNISET 37 as described in regard to FIG. 6. The preprocessing 72 is supposed to improve the quality, from the standpoint of calibration, of the data pertaining to the reflectors.

The preprocessing step 72 may involve one or more steps of formatting of the data resulting from ultrasound measurements, verification of the consistency of this data, standardization, and more generally any statistical processing.

In one embodiment, the preprocessing step 72 involves a subsidiary step in which one verifies the consistency of the data relative to the directional reflectors, for example, the data of the set UNISET 37, and/or the data relative to the polydirectional reflector, for example, the data of the set OMNISET 38.

This is the case, in particular, when symmetries exist in the directions of inspection corresponding to the working directions of the polydirectional reflector and/or to that of the directional reflectors. For example, when the set of data relative to the directional reflectors, or the set UNISET 37, contains pairs whose angles correspond to centrally symmetrical directions of inspection, one can verify that the amplitude values of these pairs are close to each other, especially when the directional reflectors are realized in the form of notches. An analogous verification can be done for the data of the set relative to the polydirectional reflector, in particular when this is realized in the form of a hole of circular section, or more generally a polygonal one.

Otherwise, as an option, one assigns to these pairs modified amplitude values, statistically calculated from origin values. For example, one assigns to each of the symmetrical pairs an amplitude value calculated as the mean of the original amplitude values. A similar processing can be done for the set of data relative to the polydirectional reflector, for example, the set OMNISET 39.

Tables 2.1 and 2.2 are analogous to Tables 1.1 and 1.2, except that the amplitude values have been modified to take account of symmetry effects in the directions of inspection. In Table 2.1, for example, one takes into account that the rows corresponding to the angles 45° and 225° involve the same notch, for example, of the kind of notch 15 of FIG. 3, by assigning as the amplitude value to each of these rows the mean value of the corresponding rows in Table 1.1.

The preprocessing step 72 is followed by a statistical processing step 74 of the data relative to the polydirectional reflector and the directional reflectors, for example, the data UNISET 37 and OMNISET 39, respectively. The data relative to the directional reflectors is interpolated with the aid of at least some of the data relative to the polydirectional reflector in order to complete the set of data relative to the directional reflectors. One thus establishes value/amplitude pairs representative of responses of directional reflectors directed in different orientations. The interpolation of the pairs of the first set of data and of the second set of data makes it possible to obtain pairs of a third set corresponding to standard amplitudes for ultrasound inspections directed according to at least some of the working directions of the polydirectional reflector.

At the end of the statistical processing 74, the set of data relative to the directional reflectors, or the set UNISET 37, contains value/angle pairs each corresponding to a response amplitude of a directional reflector whose working direction, in the pipe, corresponds to the direction of inspection as defined by the angle.

Finally, the processing comprises a comparison step 76, which involves the data resulting from the statistical processing of step 74. This data is compared to target data, at least partly defined with the aid of calibration parameters, to establish a set of data useful to the calibration. This useful data comprises in particular a plurality of value/angle pairs each involving a modified gain value for a direction of inspection defined by the angle, or direction being calibrated.

Figure 8:
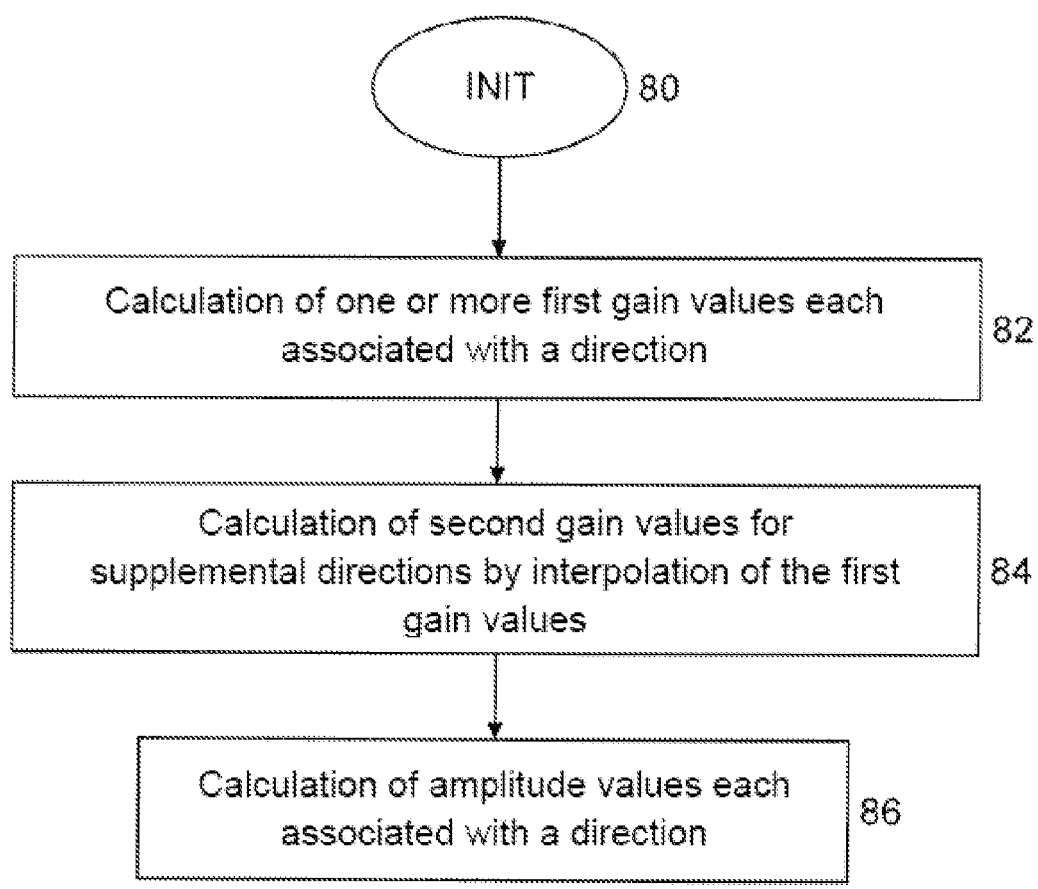
FIG. 8 shows a flow chart illustrating a statistical processing function which can be used in the module of FIG. 6.

FIG. 8 illustrates one embodiment of a statistical processing, or interpolation function, which can be used for example to implement step 74 described in regard to FIG. 7.

The interpolation starts with an initialization step 80, followed by a step 82 during which one establishes one or more value/angle pairs each one corresponding to a gain value associated with a directional parameter. The directional parameter corresponds to a direction of inspection, while the gain value corresponds to a ratio of response amplitudes of the directional reflector on the one hand, and the polydirectional reflector, on the other, to an inspection whose direction is defined by the angle of the pair. One uses for example an indexed table, which can be of dimension N, designated here the Table of measured gains, or Table MES_GAIN[ ].

The gain values are calculated from amplitude values of the pairs of the set of data relative to the directional reflectors, for example, the set UNISET 37, and amplitude values of pairs of the set of data relative to the polydirectional reflector of corresponding angle, for example the set OMNISET, preprocessed if desired. Angle values correspond to each other if they designate identical directions or, lacking this, if they are slightly inclined relative to each other. This is the case, in particular, with identical angle values.

For each value/angle pair relative to a directional reflector, one establishes a gain value with the help of the amplitude value of the value/angle pair relative to the polydirectional reflector whose angle determines a direction corresponding to the working direction of the directional reflector.

The pairs relative to the directional reflectors can be fewer in number than those relative to the polydirectional reflector, which makes it possible to use a slight number of notches of different orientations from each other. The gain can be expressed in decibel, making the ratio of the amplitude value of the directional reflector to that of the polydirectional reflector.

Table 3.1 illustrates an example of the content of the set of measured gains in the case of the notches and opening described above. The left-hand column of each row corresponds to the ratio, expressed in decibel, of the amplitude of the left-hand column of Table 2.1 (notches) to the amplitude of the left hand column of Table 2.2 (boring) for the same angle value.

Next comes a step 84 during which one establishes supplemental value/angle pairs corresponding to gain values for directions of inspection which differ from the working directions of the directional reflectors. Here, one establishes a supplemental pair for each direction of inspection corresponding to a working direction of the polydirectional reflector. One interpolates the gain values of the value/angle pairs established in the previous step for working directions of the directional and poly-directional reflectors that correspond to each other. The interpolation can implement a linear regression method, for example. The linear regression method works well with the number of notches described here, that is, 4. Other interpolation methods can be used. In particular, more complex methods, for example of second order, can be contemplated when the number of reflectors is less (than 8).

The results of the interpolation can be saved in a table, such as an indexed Table SIM_GAIN[ ] of dimension N, whose index corresponds to the directions of inspections in the Table DIRECT[ ]. Table 3.2 illustrates an example of the content of such a table. The gain values of the rows 0, 45, 90, 135, 180, 225, 280 and 325, which involve working directions of notches, correspond to the gain values of the same rows in Table 3.1. The gain values indicated in the other rows involve directions of inspection to be calibrated and they result from an interpolation of the data obtained with the working directions of the notches. The interpolation here is done by linear regression. For example, the gain value of 2.0 decibels obtained in row 25° for the left-hand column is calculated from the gain value of row 0° of Table 3.1, to which is added the difference of the gains of rows 45° and 0°, referred to the angular difference between these rows, which multiplies the angle deviation between row 25° and row 0°.

During a step 86, one uses the gain values of the pairs of steps 82 and 84 together with the amplitude values of the pairs relative to the polydirectional reflector to establish a set of value/angle pairs corresponding to amplitude values each associated with a directional parameter. One applies to the amplitude value of each value/angle pair of the set of data relative to the directional reflector the gain value to which the angle corresponds. The result is saved in memory in the form of a new value/angle pair which can be viewed as a response amplitude value of a virtual directional reflector associated with the orientation of this reflector as a directional parameter. The set of pairs obtained can be saved in memory as a new set of data, comprising for example an indexed Table SIM_AMP[ ] of dimension N, or used to complete the set of data relative to the directional reflectors, for example a table of the kind of Table N_AMP[ ].

Table 3.3 illustrates the result of step 86, such as may be contained in the Table SIM_AMP[ ] for example. In each row, the amplitude value is calculated from the amplitude of the corresponding row for the opening in Table 2.2 and the simulated gain of the corresponding row in Table 3.2. For example, the value 64.3% of row 25° is obtained from the corresponding amplitude value of Table 2.2 which multiplies the value 10 raised to a power of the gain divided by 20.

The gain being regulated for each direction of inspection can then be calculated by correcting the initial gain value, for example the gain IG, with the ratio, in decibels, of the amplitude value resulting from the interpolation to the target amplitude value, for example the value TS. Table 4.1 illustrates an example of gain values so obtained for values of IG at 11 decibels and TG at 80%. Table 4.2 illustrates the fact that the gain adjustment values obtained for the outside of the sample pipe can be expressed relative to the gain values obtained for the inside of the pipe.

Figure 9:
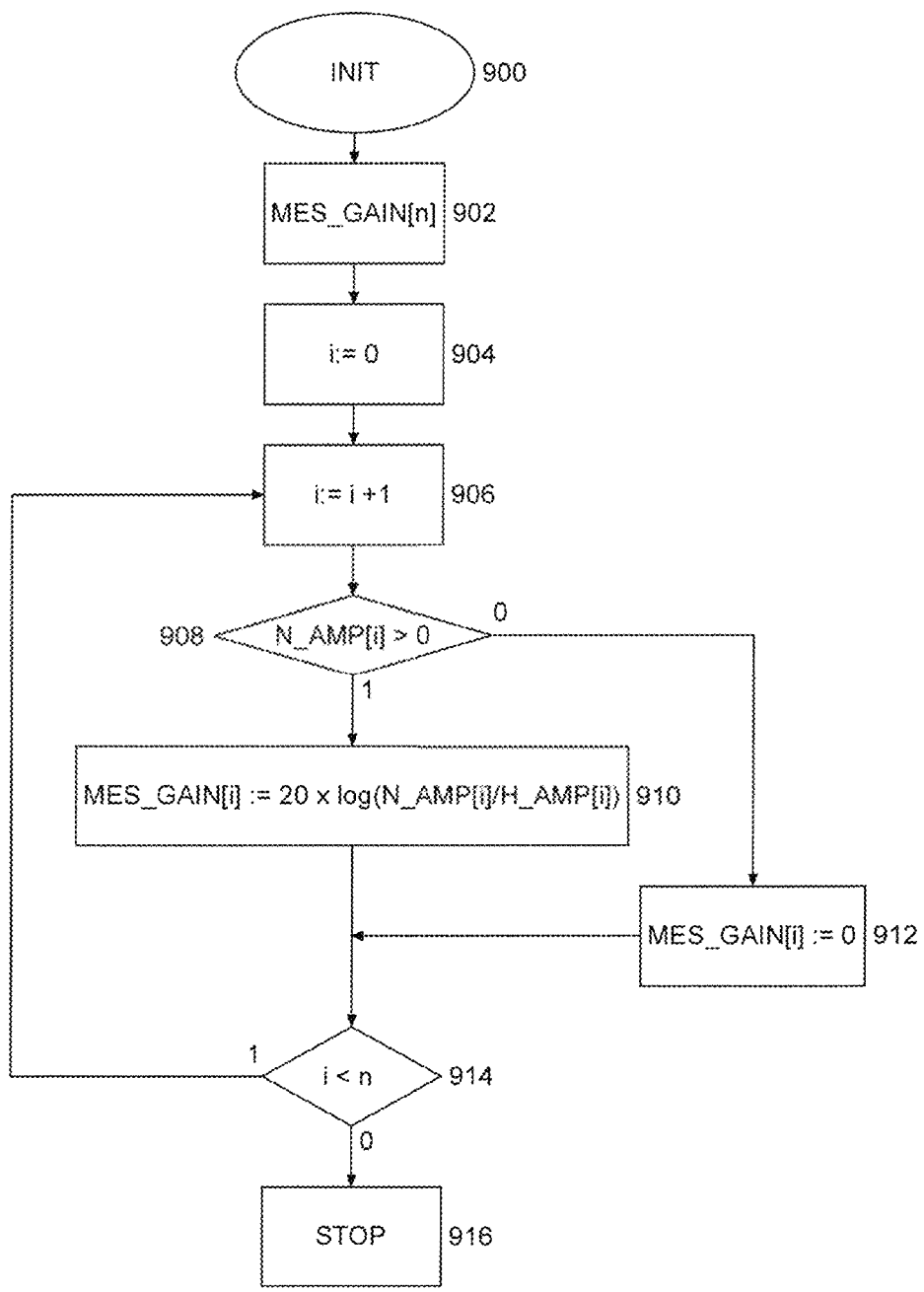
FIG. 9 shows a flow chart illustrating a comparative function which can be used in the module of FIG. 6.

FIG. 9 illustrates an embodiment of a comparative function able to establish a set of gain values from pairs relative to directional and poly-directional reflectors, respectively, such as those saved in the Tables H_AMP[ ] and N_AMP [ ] described above.

In step 900, the function is initialized. In step 902, one defines an indexed table of data of dimension N, or the Table of gain MES_GAIN[ ]. In step 904, one starts a loop structure by initializing the loop counter, here the dummy variable i. In step 906, one increments the loop counter. In step 908, one verifies whether an amplitude value exists in column i of Table N_AMP[ ] by checking whether the value N_AMP[i] saved in column i is greater than zero.

If so, one then calculates a gain value as a ratio of the index value i of the values saved in the Table N_AMP[ ] to the value saved in Table H_AMP[ ] (step 910). The gain is calculated in decibel. The calculated value is saved in column i of the gain table MES_GAIN[ ].

Otherwise, one assigns zero value to element i of the gain table MES_GAIN[ ] during step 912. At the end of steps 910 and 912, one checks to see if the loop counter i has reached the value N, indicative of the end of the loop (step 914). If so, the function stops at 916. Otherwise, one returns to step 906.

Figure 10:
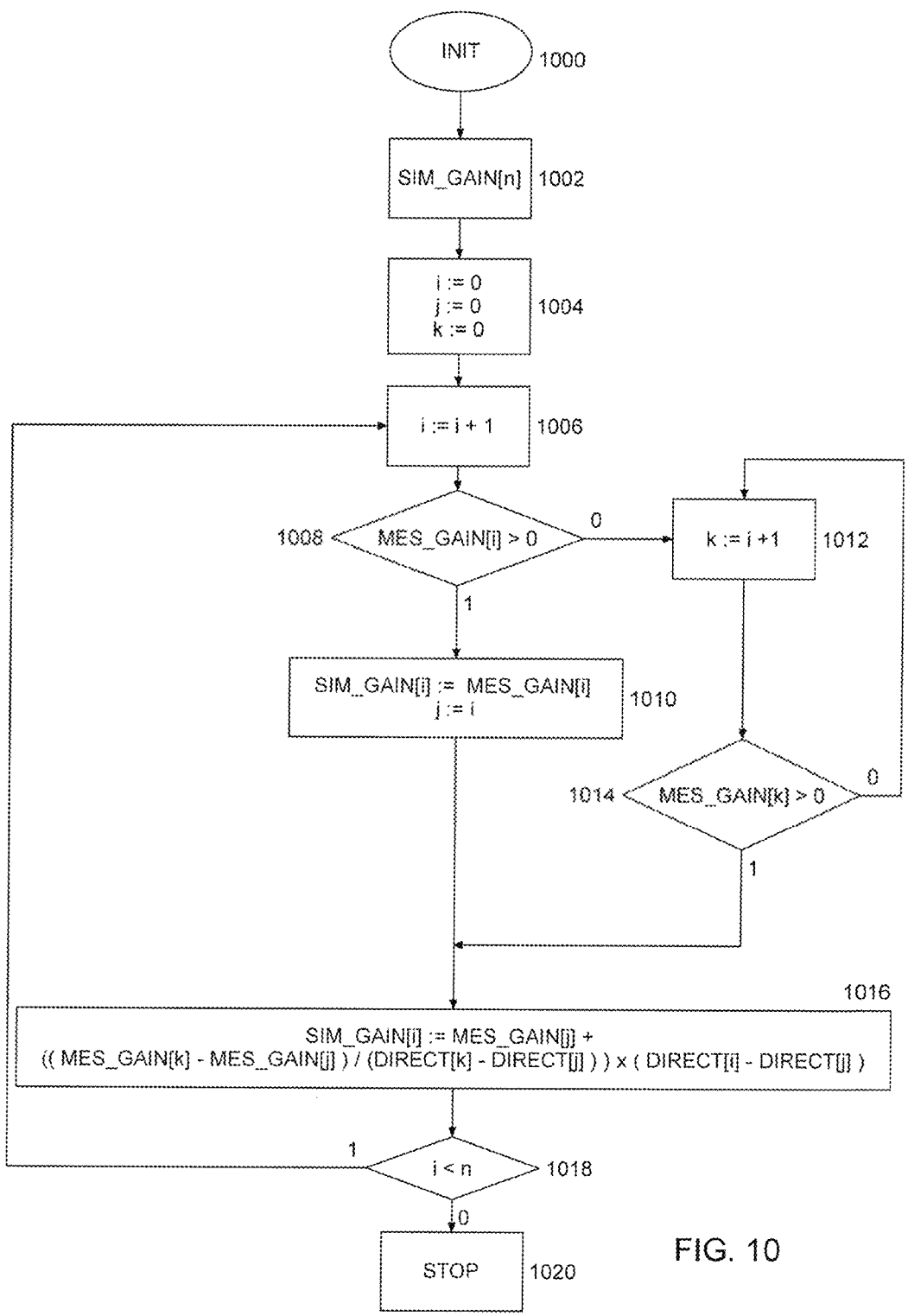
FIG. 10 shows a flow chart illustrating an interpolation function which can be used in the module of FIG. 6.

FIG. 10 illustrates one embodiment of an interpolation function able to calculate value/angle pairs corresponding to gain values by interpolation of value/angle pairs corresponding to gain values each associated with a directional parameter, such as those saved in the Table MES_GAIN[ ].

It starts with an initialization step 1000. During a step 1002, one declares a new indexed Table SIM_GAIN[ ] of dimension N to receive the calculation data.

In the next step, step 1004, one initializes three dummy variables i, j and k. One increments the variable i as a loop counter, in step 1006.

In step 1008, one checks to see if the element i of the first Table of gains MES_GAIN[ ] contains a value.

If so, then in step 1010 one saves in memory the value MES_GAIN[i] in column i of the second Table SIM_GAIN [ ], and assigns to the variable j the value of the variable i.

Otherwise, in step 1012, one assigns to the variable k an incremented value of the first loop counter i. And in a step 1014 one checks to see if the first Table of gain MES_GAIN [ ] contains a nonzero value in its column designated for the value of the variable k. Otherwise, one returns to step 1012.

At the end of steps 1010 and 1014, one establishes (step 1016) a new gain value which is saved in column i of the second Table of gain SIM_GAIN[ ] based on the following formula (A):

$$\text{SIM\_GAIN}[i] := \text{MES\_GAIN}[j] + ((\text{MES\_GAIN}[k] - \text{MES\_GAIN}[j])/(\text{DIRECT}[k] - \text{DIRECT}[j])) \times (\text{DIRECT}[i] - \text{DIRECT}[j]) \qquad \text{A:}$$

One then tests, in step 1018, whether the loop counter i has reached its final value n. If so, one stops in step 1020. Otherwise, one returns to step 1006.

Figure 11:
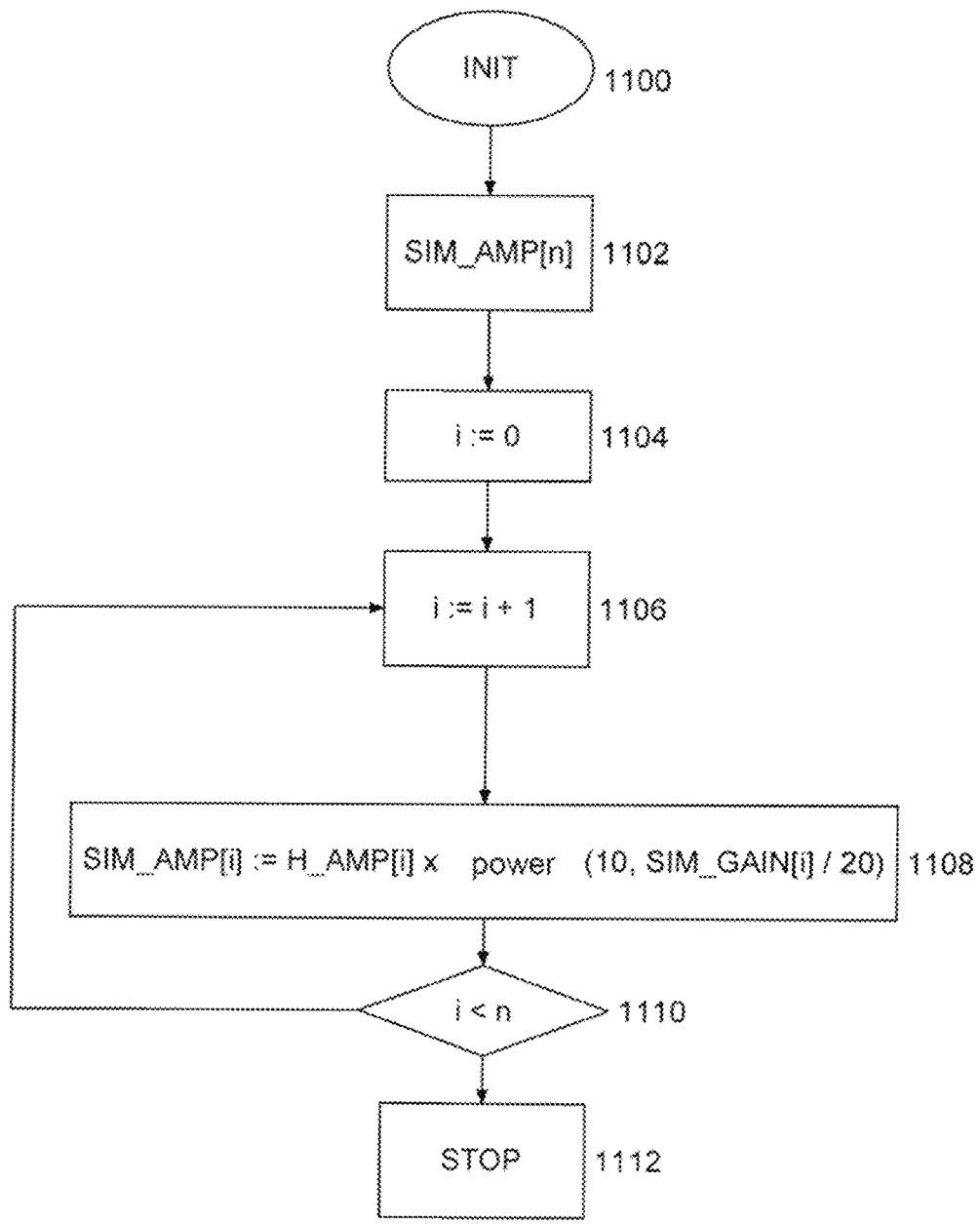
FIG. 11 is analogous to FIG. 10 and concerns another simulation function.

FIG. 11 illustrates an embodiment of a simulation function able to calculate value/angle pairs corresponding to amplitude values based on value/angle pairs corresponding to gain values each associated with a directional parameter, such as those saved in the Table SIM_GAIN[ ], for example.

It starts with an initialization step 1100. In a step 1102, one declares a new indexed Table SIM_AMP[ ], for example of dimension N, intended to receive the calculation data.

In the next step 1104, one initializes a dummy variable i as a loop counter. One increments the counter i, in step 1106. In step 1108, one assigns to the i-th element of the Table SIM_AMP[ ] a value calculated on the basis of the following formula (B):

$$\text{SIM\_AMP}[i] := \text{H\_AMP}[i] \times \text{power}(10, \text{SIM\_GAIN}[i]/20) \qquad \text{B:}$$

In step 1110, one checks to see whether the value of the loop counter i is less than the value N.

If so, one returns to step 1106. Otherwise, the function stops at step 1112.

Figure 12:
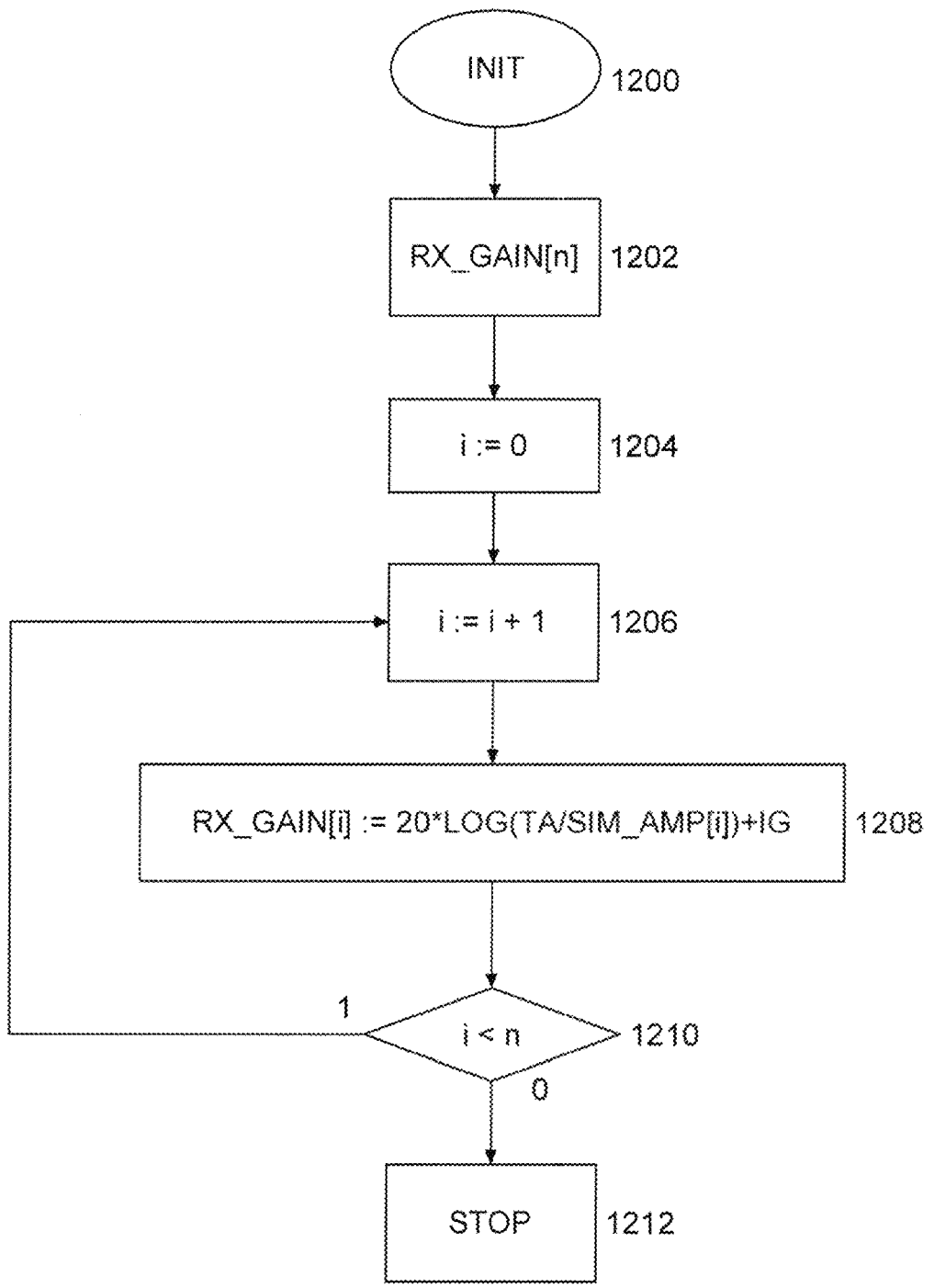
FIG. 12 shows a flow chart illustrating a conversion function which can be used in the module of FIG. 6.

FIG. 12 illustrates an embodiment of a conversion function able to calculate value/angle pairs corresponding to gain values each associated with a directional parameter, such as those saved in the Table SIM_AMP[ ].

The function starts with an initialization step 1200.

In a step 1202, one creates an indexed table RX_GAIN [ ] of dimension N to receive the calculation data.

In the next step, step 1204, one initializes a dummy variable i as a loop counter.

In step 1206, one increments the loop counter i and then in step 1208 one assigns as the i-th element of the Table RX_GAIN[ ] the value calculated on the basis of the following formula (C):

$$\text{RX\_GAIN}[i] := 20 \times \text{LOG}(\text{TA}/\text{SIM\_AMP}[i]) + \text{IG} \qquad \text{C:}$$

In the next step, step 1210, one tests to see whether the loop counter is strictly less than the end value of the loop N. If so, one then returns to step 1206. Otherwise, the function stops at step 1212.

The CALIBR function 35 works on the first set of data, relative to one or more directional reflectors disposed in the sample pipe, and on the second set of data relative to a polydirectional reflector disposed in this pipe.

The obtaining of data relative to these reflectors can be done in the classical manner. For example, for each measurement one performs an ultrasound shot in the working direction of a directional reflector, and in a manner corresponding to this direction. And during each measurement one performs as many shots as there are directions of inspections or working directions of the polydirectional reflector. The use of an ultrasound transducer of multi-element type facilitates the measurements: the laws of delay make it possible to orient the ultrasound beam without modifying the relative position of the transducer in regard to the sample pipe.

To speed up the measurements, one can use a device of the kind described in the French patent application FR 3 000 212 in the name of the applicant. A single shot is then able to obtain amplitude data in several directions differing from each other.

In practice, one will preferably use for the calibration an inspection configuration similar to that used in production. This greatly improves the inspections performed in production.

One can also use a device of the type known by the electronic brand of FAAST II (for example, as shown at address http://www.socomate.com/2-products/phased-array/faast-ii-2d-matrix-active-8×40e-2mhz-21.htm) of the SOCOMATE company, or a device of the kind known by the installation brand GRP (for example, as shown at the address http://www.ge-mcs.com/en/ultrasound/integrated-systems/tubepipe-grp.html) of the GENERAL ELECTRIC company.

The quality of the calibration data established by the CALIBR function 35 is influenced by the quality of the original data used to form the first and second sets of data. The original data comes from ultrasound measurements taken on the sample pipe.

The directional reflectors, such as the notches 7 described in regard to FIGS. 3 to 5, generally have one dimension which is more significant than the others, corresponding to the working direction of the reflector. This property can be used to obtain several values for the amplitude of reflection of a particular reflector for the same direction of inspection.

Generally one takes several measurements for each reflector, at least for the directional reflectors. Between two measurements, the sample pipe and the ultrasound transducer are displaced relative to each other, for example by one millimeter. This is why the length of the notch is generally the subject of a minimal specification: this makes it possible to ensure, given a number of shots per unit of advancement of the pipe, the detection of a notch of minimal length with a parametrizable number of points.

Having measured for one directional reflector a set of value/angle pairs designating different amplitude values for the same angle value, corresponding to one direction of inspection, it is advisable to establish a representative amplitude value, for use in the set of data relative to this directional reflector. Using the maximum amplitude value as the representative value is not sufficient: this results in only qualifying imperfections of major size as being a defect. Neither is using the mean amplitude value sufficient: one risks not detecting the reflectors if they are highly dispersed.

According to one embodiment, the CALIBR function 35 is able to extract from such a set of amplitude values an amplitude value characteristic of the directional reflector. This characteristic value is established as a threshold value making it possible to obtain a predetermined number of successive amplitude values higher than this threshold value. The number in question corresponds to a resolution. It is parametrizable. The measurements of the tables in annex 1 for example correspond to a resolution of 3 successive points.

Figure 13:
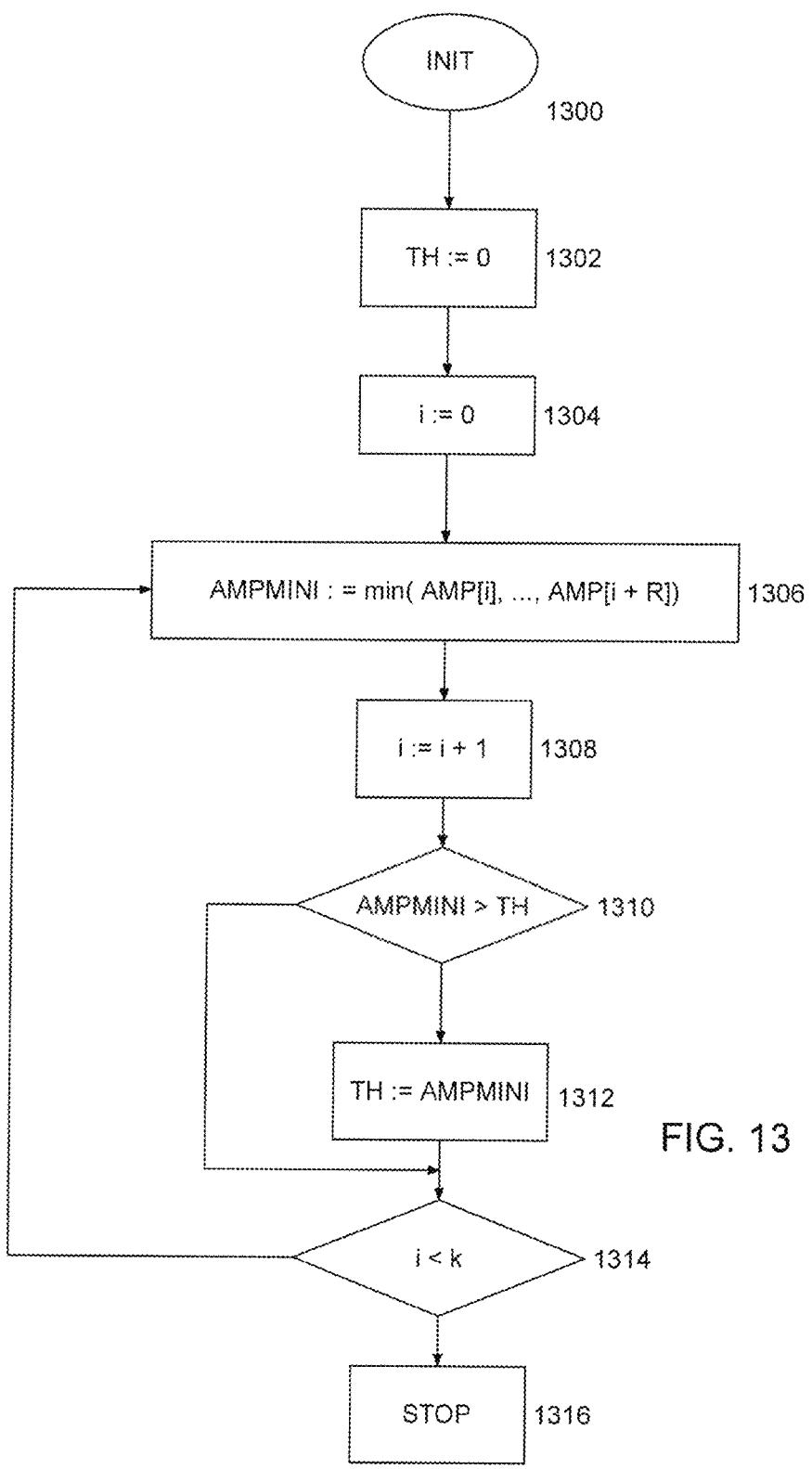
FIG. 13 shows a flow chart illustrating an extraction function which can be used in the module of FIG. 6.

FIG. 13 illustrates an embodiment of an extraction function which can be used to obtain a characteristic amplitude value of a directional reflector based on a set of amplitude values associated with the same direction of inspection.

It starts with an initialization step 1300 in which it receives, as the parameter, an integer value R as the resolution value. One also receives a set of amplitude values, such as in the form of an indexed table of dimension k, or Table AMP[k]. These amplitude values concern the same directional reflector and the same direction of inspection.

In step 1302, one defines a variable TH which is initialized at zero value. Next one starts a loop structure with the help of a dummy variable i as a counter. The counter is initialized (step 1304). In the next step 1306, one determines the minimal value AMPMINI among the amplitude values saved in memory in Table AMP[k] for the element i, for the element i+R, and in all the elements situated between the latter.

In step 1308, the loop counter is incremented. In step 1310, one checks to see if the minimal amplitude value AMPMINI is greater than the value TH. If so, then in step 1312 the threshold value TH takes on the minimal amplitude value AMPMINI. Otherwise, as at the end of step 1312, one checks to see whether the loop counter has reached its end value k (step 1314). If so, the function stops at 1316. Otherwise, one returns to 1306. The final value TH corresponds to a threshold value characterizing the directional reflector.

Figure 14:
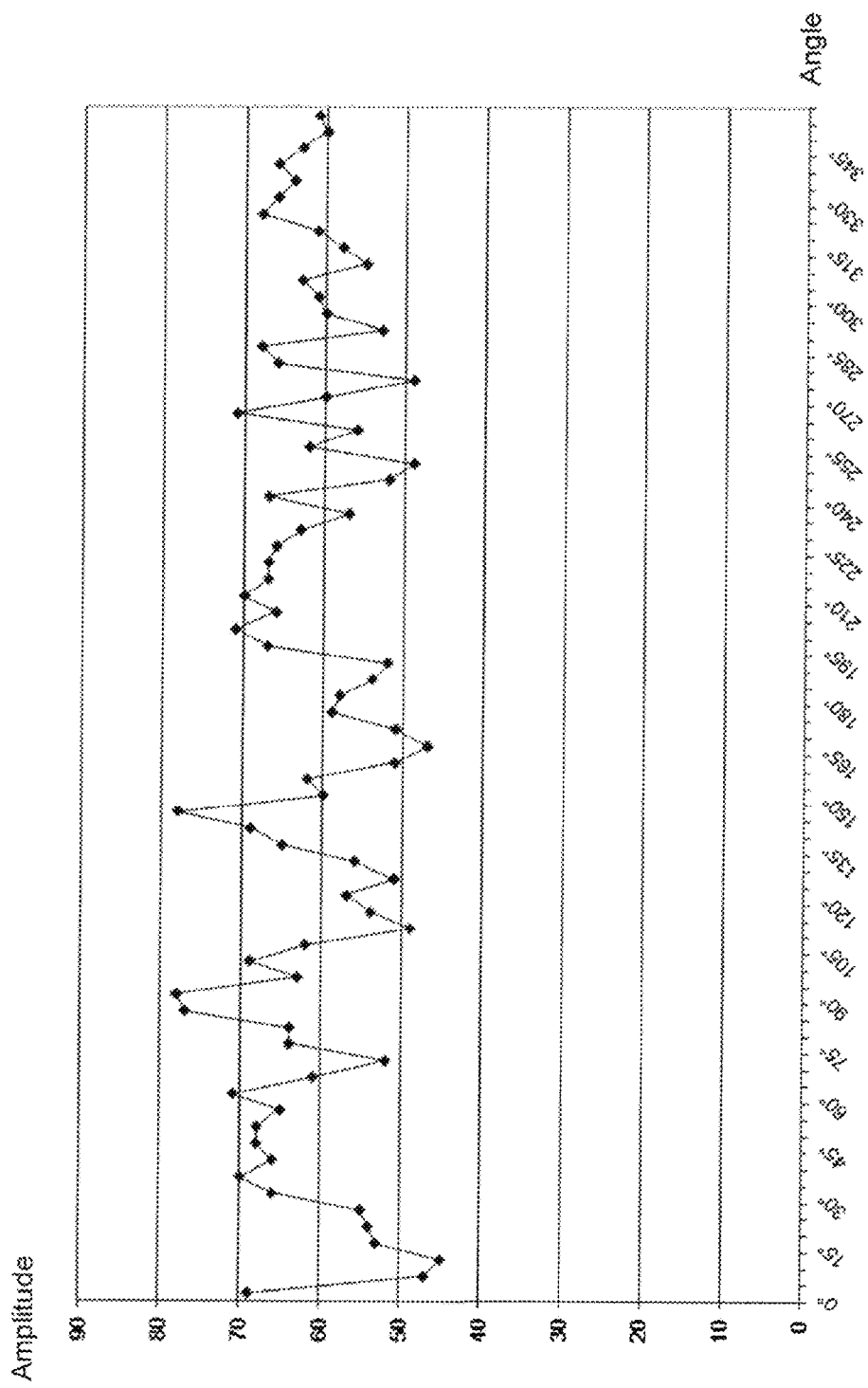
FIG. 14 shows a graph illustrating the reliability of the module of FIG. 6.
Figure 15:
FIG. 15 is analogous to FIG. 14.

We shall now refer to FIGS. 14 and 15 which illustrate the performance of the device to help in the calibration in the case of a sample pipe of 88.9 millimeters diameter and 7.61 millimeters thickness.

The graph of FIG. 14 shows the amplitude values obtained for exterior (actual) notches oriented around 360° with a step of 5° in the case of a calibration performed with the described device, parameterized with a threshold amplitude value at 60%. The inspection was done 10 times, and the least favorable amplitude value was considered, that is, the experimental value the furthest from the target amplitude value.

The graph of FIG. 15 is analogous to FIG. 14 except that it shows the difference between the measured values and the calibrated values in decibels. FIG. 15 reveals a dispersion value of around 6.4 decibels. This value is compatible with industrial requirements.

The following table shows dispersion values obtained under similar conditions, for pipes of different size, having external and/or internal notches as the case may be. The values shown confirm that the described calibration device is sufficiently precise to be used in an industrial manner.

| Sample pipe (diameter × thickness) | Internal notches (in decibels) | External notches (in decibels) |
| --- | --- | --- |
| 88.9 × 7.61 mm | 4.4 | 6.4 |
| 339.7 × 16 mm | 6.5 | 6.9 |
| 231 × 10 mm | none | 7.8 |

We have described a device, or module, to help in the calibration of an inspection device for a metallurgical product, especially a pipe. The module uses data measured for ultrasound inspections performed at a polydirectional reflector, especially a boring, and at one or more directional reflectors, such as those of notch type. The directions of inspections used for the measurements preferably correspond to the directions of inspection used in production: this greatly improves the calibration. Each notch is directed along a respective direction of inspection. One therefore uses fewer directional reflectors than there are directions of inspection being calibrated: the directions of inspection not corresponding to any working direction of a directional reflector are calibrated with the aid of amplitudes measured with the polydirectional reflector, for a corresponding working direction. The amplitudes measured at the polydirectional reflector are corrected on the basis of a comparison of the amplitude values obtained, for the same direction of inspection, for the directional reflectors and the polydirectional reflector. This makes it possible to continue using the directional reflectors, in particular the notches, as standard defects whose geometrical characteristics can if necessary be the subject of a specification, while still reducing their number. In other words, this makes it possible to use one or more standard defects regardless of their orientation in the pipe to standardize a plurality of directions of inspection.

Moreover, only the directional reflectors need to be dimensioned for purposes of the calibration.

The invention has essentially been presented in the form of a device. It can also be viewed as a method for helping in the calibration of an inspection device for metallurgical products. According to this method, one saves a first set of data in the form of value/angle pairs, the first set of data concerning a polydirectional reflector disposed in the metallurgical product, the value/angle pairs of the first set of data corresponding to measured return amplitudes resulting from ultrasound shots directed, in the metallurgical product, along at least some of the working directions of the polydirectional reflector corresponding to said angle. One also saves a second set of data in the form of value/angle pairs, the second set of data concerning a directional reflector disposed in the metallurgical product, the second set of data comprising, for the directional reflector, a value/angle pair corresponding to a measured return amplitude resulting from an ultrasound shot directed along one working direction of the reflector corresponding to said angle. One establishes a third set of data, in the form of value/angle pairs, by interpolation of the pairs of the first set of data and the second set of data, the pairs of the third set corresponding to standard amplitudes for ultrasound shots directed in a way that corresponds to at least some of the working directions of the polydirectional reflector.

The invention can also be expressed in the form of a computer program product able to cooperate with a calculation unit to constitute a module to help in calibration of the kind described above.

The invention is not limited to the embodiments described above, solely as an example, but also encompasses all variants which can be envisioned by the skilled person. In particular:

- There have been described directional reflectors and a polydirectional reflector disposed in the same sample pipe. As a variant, they could be disposed in sample pipes which are similar, yet distinct from each other.
- There have been described directional reflectors in the form of elongated notches. This embodiment conforms to current practice, which involves calibrating the methods and devices for ultrasound inspection by means of notches of standardized, or at least specified dimensions. This is why a sample pipe provided with notches of identical length has been described. Yet the proposed device and the method work just as well with notches having length different from each other.
- We have described several forms of saving of the value/angle pairs, in particular in the form of tables directly saving these values. The invention is in no way limited to these described forms of data storage: what counts is that there is a linkage between elements making it possible to define a direction of inspection and elements making it possible to define a response amplitude value, and that the processing function uses this linkage to process the corresponding data. For example, one could use different angles for the different sets of data in order to define the same direction of inspection, which would only have the effect of making the data processing more complicated.
- We have described a module comprising memory and a calculator able to perform the CALIBR function 35. The module can take on very different forms, for example, a dedicated calculation unit, integrated in the command computer of an inspection layout, or more generally in a computer involved in the inspection process of the metallurgical products. In one embodiment, the module in question can comprise a file readable by a spreadsheet, whose cells contain the data, and the different functions of the CALBR function 35 are entered in the form of calculation rules between cells.

The invention has been defined with respect to ultrasound inspections. An ultrasound inspection comprising at least one ultrasound shot, the invention can also be defined as a module to help in the calibration of an inspection device for metallurgical products comprising memory able to save data in the form of value/angle pairs, each pair corresponding to a return amplitude of an ultrasound shot along a direction of the metallurgical product corresponding to said angle, and a calculator able to execute a processing function on the data saved in memory. The data is organized into a first set of data concerning a polydirectional reflector disposed in the metallurgical product, the pairs of the first set corresponding to return amplitudes along at least some of the working directions of the polydirectional reflector, and a second set of data concerning a directional reflector disposed in the metallurgical product, the second set of data comprising, for the directional reflector, at least one pair corresponding to a return amplitude along one working direction of the reflector. The processing function is designed to establish a third set of data by interpolation of the pairs of the first set of data and the second set of data, the pairs of the third set corresponding to standard amplitudes for at least some of the working directions of the polydirectional reflector.

Annex 1: Original Data

TABLE 1.1 responses of notches

| Direction | Internal | External |
|---|---|---|
| 0 | 85.0 | 70.0 |
| 45 | 71.0 | 50.0 |
| 90 | 95.0 | 32.0 |
| 135 | 81.0 | 52.0 |
| 180 | 81.0 | 63.0 |
| 225 | 76.0 | 52.0 |
| 270 | 86.0 | 40.0 |
| 315 | 85.0 | 58.0 |

TABLE 1.2 responses of the opening (in amplitude)

| Direction | Internal | External |
|---|---|---|
| 0 | 93.0 | 52.0 |
| 5 | 90.0 | 53.0 |
| 10 | 80.0 | 48.0 |
| 15 | 65.0 | 38.0 |
| 20 | 55.0 | 32.0 |
| 25 | 64.0 | 37.0 |
| 30 | 68.0 | 39.0 |
| 35 | 67.0 | 37.0 |
| 40 | 65.0 | 38.0 |
| 45 | 66.0 | 39.0 |
| 50 | 69.0 | 41.0 |
| 55 | 68.0 | 38.0 |
| 60 | 64.0 | 36.0 |
| 65 | 58.0 | 35.0 |
| 70 | 52.0 | 34.0 |
| 75 | 61.0 | 35.0 |
| 80 | 71.0 | 34.0 |
| 85 | 78.0 | 39.0 |
| 90 | 79.0 | 42.0 |

TABLE 1.2-continued responses of the opening (in amplitude)

| Direction | Internal | External |
|---|---|---|
| 95 | 76.0 | 41.0 |
| 100 | 71.0 | 36.0 |
| 105 | 62.0 | 30.0 |
| 110 | 52.0 | 29.0 |
| 115 | 55.0 | 33.0 |
| 120 | 61.0 | 37.0 |
| 125 | 63.0 | 39.0 |
| 130 | 61.0 | 39.0 |
| 135 | 55.0 | 36.0 |
| 140 | 47.0 | 33.0 |
| 145 | 46.0 | 29.0 |
| 150 | 45.0 | 31.0 |
| 155 | 43.0 | 34.0 |
| 160 | 35.0 | 30.0 |
| 165 | 34.0 | 29.0 |
| 170 | 43.0 | 35.0 |
| 175 | 49.0 | 39.0 |
| 180 | 50.0 | 41.0 |
| 185 | 48.0 | 39.0 |
| 190 | 41.0 | 34.0 |
| 195 | 32.0 | 26.0 |
| 200 | 33.0 | 31.0 |
| 205 | 38.0 | 36.0 |
| 210 | 40.0 | 35.0 |
| 215 | 37.0 | 31.0 |
| 220 | 37.0 | 34.0 |
| 225 | 43.0 | 35.0 |
| 230 | 50.0 | 34.0 |
| 235 | 52.0 | 34.0 |
| 240 | 52.0 | 33.0 |
| 245 | 47.0 | 31.0 |
| 250 | 44.0 | 26.0 |
| 255 | 53.0 | 28.0 |
| 260 | 63.0 | 32.0 |
| 265 | 69.0 | 37.0 |
| 270 | 74.0 | 40.0 |
| 275 | 76.0 | 39.0 |
| 280 | 72.0 | 36.0 |
| 285 | 65.0 | 36.0 |
| 290 | 57.0 | 35.0 |
| 295 | 61.0 | 36.0 |
| 300 | 68.0 | 43.0 |
| 305 | 74.0 | 47.0 |
| 310 | 75.0 | 46.0 |
| 315 | 71.0 | 43.0 |
| 320 | 66.0 | 39.0 |
| 325 | 67.0 | 38.0 |
| 330 | 68.0 | 40.0 |
| 335 | 65.0 | 41.0 |
| 340 | 59.0 | 38.0 |
| 345 | 55.0 | 32.0 |
| 350 | 71.0 | 40.0 |
| 355 | 86.0 | 48.0 |

Annex 2: Data Resulting from a Preprocessing

TABLE 2.1 responses of notches (in amplitude)

| Direction | Internal | External |
|---|---|---|
| 0 | 83.0 | 66.5 |
| 45 | 73.5 | 51.0 |
| 90 | 90.5 | 36.0 |
| 135 | 83.0 | 55.0 |
| 180 | 83.0 | 66.5 |
| 225 | 73.5 | 51.0 |
| 270 | 90.5 | 36.0 |
| 315 | 83.0 | 55.0 |

TABLE 2.2 responses of the opening (in amplitude)

| Direction | Internal | External |
|---|---|---|
| 0 | 71.5 | 46.5 |
| 5 | 69.0 | 46.0 |
| 10 | 60.5 | 41.0 |
| 15 | 48.5 | 32.0 |
| 20 | 44.0 | 31.5 |
| 25 | 51.0 | 36.5 |
| 30 | 54.0 | 37.0 |
| 35 | 52.0 | 34.0 |
| 40 | 51.0 | 36.0 |
| 45 | 54.5 | 37.0 |
| 50 | 59.5 | 37.5 |
| 55 | 60.0 | 36.0 |
| 60 | 58.0 | 34.5 |
| 65 | 52.5 | 33.0 |
| 70 | 48.0 | 30.0 |
| 75 | 57.0 | 31.5 |
| 80 | 67.0 | 33.0 |
| 85 | 73.5 | 38.0 |
| 90 | 76.5 | 41.0 |
| 95 | 76.0 | 40.0 |
| 100 | 71.5 | 36.0 |
| 105 | 63.5 | 33.0 |
| 110 | 54.5 | 32.0 |
| 115 | 58.0 | 34.5 |
| 120 | 64.5 | 40.0 |
| 125 | 68.5 | 43.0 |
| 130 | 68.0 | 42.5 |
| 135 | 63.0 | 39.5 |
| 140 | 56.5 | 36.0 |
| 145 | 56.5 | 33.5 |
| 150 | 56.5 | 35.5 |
| 155 | 54.0 | 37.5 |
| 160 | 47.0 | 34.0 |
| 165 | 44.5 | 30.5 |
| 170 | 57.0 | 37.5 |
| 175 | 67.5 | 43.5 |
| 180 | 71.5 | 46.5 |
| 185 | 69.0 | 46.0 |
| 190 | 60.5 | 41.0 |
| 195 | 48.5 | 32.0 |
| 200 | 44.0 | 31.5 |
| 205 | 51.0 | 36.5 |
| 210 | 54.0 | 37.0 |
| 215 | 52.0 | 34.0 |
| 220 | 51.0 | 36.0 |
| 225 | 54.5 | 37.0 |
| 230 | 59.5 | 37.5 |
| 235 | 60.0 | 36.0 |
| 240 | 58.0 | 34.5 |
| 245 | 52.5 | 33.0 |
| 250 | 48.0 | 30.0 |
| 255 | 57.0 | 31.5 |
| 260 | 67.0 | 33.0 |
| 265 | 73.5 | 38.0 |
| 270 | 76.5 | 41.0 |
| 275 | 76.0 | 40.0 |
| 280 | 71.5 | 36.0 |
| 285 | 63.5 | 33.0 |
| 290 | 54.5 | 32.0 |
| 295 | 58.0 | 34.5 |
| 300 | 64.5 | 40.0 |
| 305 | 68.5 | 43.0 |
| 310 | 68.0 | 42.5 |
| 315 | 63.0 | 39.5 |
| 320 | 56.5 | 36.0 |
| 325 | 56.5 | 33.5 |
| 330 | 56.5 | 35.5 |
| 335 | 54.0 | 37.5 |
| 340 | 47.0 | 34.0 |
| 345 | 44.5 | 30.5 |
| 350 | 57.0 | 37.5 |
| 355 | 67.5 | 43.5 |

Annex 3: Ratio of Opening/Notches Response

TABLE 3.1 ratios of measured responses (in gain)

| Direction | Internal | External |
|---|---|---|
| 0 | 1.30 | 3.11 |
| 45 | 2.60 | 2.79 |
| 90 | 1.46 | −1.13 |
| 135 | 2.39 | 2.88 |
| 180 | 1.30 | 3.11 |
| 228 | 2.60 | 2.79 |
| 270 | 1.46 | −1.13 |
| 315 | 2.39 | 2.88 |

TABLE 3.2 interpolation of responses (in gain)

| Direction | Internal | External |
|---|---|---|
| 0 | 1.3 | 3.1 |
| 5 | 1.4 | 3.1 |
| 10 | 1.6 | 3.0 |
| 15 | 1.7 | 3.0 |
| 20 | 1.9 | 3.0 |
| 25 | 2.0 | 2.9 |
| 30 | 2.2 | 2.9 |
| 35 | 2.3 | 2.9 |
| 40 | 2.5 | 2.8 |
| 45 | 2.6 | 2.8 |
| 50 | 2.5 | 2.4 |
| 55 | 2.3 | 1.9 |
| 60 | 2.2 | 1.5 |
| 65 | 2.1 | 1.0 |
| 70 | 2.0 | 0.6 |
| 75 | 1.8 | 0.2 |
| 80 | 1.7 | −0.3 |
| 85 | 1.6 | −0.7 |
| 90 | 1.5 | −1.1 |
| 95 | 1.6 | −0.7 |
| 100 | 1.7 | −0.2 |
| 105 | 1.8 | 0.2 |
| 110 | 1.9 | 0.7 |
| 115 | 2.0 | 1.1 |
| 120 | 2.1 | 1.5 |
| 125 | 2.2 | 2.0 |
| 130 | 2.3 | 2.4 |
| 135 | 2.4 | 2.9 |
| 140 | 2.3 | 2.9 |
| 145 | 2.2 | 2.9 |
| 150 | 2.0 | 3.0 |
| 155 | 1.9 | 3.0 |
| 160 | 1.8 | 3.0 |
| 165 | 1.7 | 3.0 |
| 170 | 1.5 | 3.1 |
| 175 | 1.4 | 3.1 |
| 180 | 1.3 | 3.1 |
| 185 | 1.4 | 3.1 |
| 190 | 1.6 | 3.0 |
| 195 | 1.7 | 3.0 |
| 200 | 1.9 | 3.0 |
| 205 | 2.0 | 2.9 |
| 210 | 2.2 | 2.9 |
| 215 | 2.3 | 2.9 |
| 220 | 2.5 | 2.8 |
| 225 | 2.6 | 2.8 |
| 230 | 2.7 | 2.8 |
| 235 | 2.9 | 2.7 |
| 240 | 2.3 | 2.7 |
| 245 | 2.2 | 2.6 |
| 250 | 2.0 | 2.6 |
| 255 | 1.9 | 2.6 |
| 260 | 1.8 | 2.5 |
| 265 | 1.7 | 2.5 |
| 270 | 1.5 | 2.5 |
| 275 | 1.6 | −0.7 |
| 280 | 1.7 | −0.2 |
| 285 | 1.8 | 0.2 |
| 290 | 1.9 | 0.7 |
| 295 | 2.0 | 1.1 |
| 300 | 2.1 | 1.5 |
| 305 | 2.2 | 2.0 |
| 310 | 2.3 | 2.4 |
| 315 | 2.4 | 2.9 |
| 320 | 2.3 | 2.9 |
| 325 | 2.2 | 2.9 |
| 330 | 2.0 | 3.0 |
| 335 | 1.9 | 3.0 |
| 340 | 1.8 | 3.0 |
| 345 | 1.7 | 3.0 |
| 350 | 1.5 | 3.1 |
| 355 | 1.4 | 3.1 |

TABLE 3.3 interpolation of responses (in amplitude)

| Direction | Internal | External |
|---|---|---|
| 0 | 83.0 | 66.5 |
| 5 | 81.4 | 65.5 |
| 10 | 72.6 | 58.2 |
| 15 | 59.2 | 45.2 |
| 20 | 54.6 | 44.3 |
| 25 | 64.3 | 51.1 |
| 30 | 69.3 | 51.6 |
| 35 | 67.8 | 47.3 |
| 40 | 67.6 | 49.8 |
| 45 | 73.5 | 51.0 |
| 50 | 79.1 | 49.2 |
| 55 | 78.6 | 44.9 |
| 60 | 74.9 | 40.9 |
| 65 | 66.8 | 37.2 |
| 70 | 60.2 | 32.2 |
| 75 | 70.4 | 32.1 |
| 80 | 81.6 | 32.0 |
| 85 | 88.2 | 35.1 |
| 90 | 90.5 | 36.0 |
| 95 | 91.0 | 37.0 |
| 100 | 86.6 | 35.0 |
| 105 | 77.9 | 33.8 |
| 110 | 67.6 | 34.5 |
| 115 | 72.8 | 39.1 |
| 120 | 82.0 | 47.8 |
| 125 | 88.1 | 54.0 |
| 130 | 88.5 | 56.2 |
| 135 | 83.0 | 55.0 |
| 140 | 73.4 | 50.3 |
| 145 | 72.4 | 46.9 |
| 150 | 71.4 | 49.9 |
| 155 | 67.3 | 52.8 |
| 160 | 57.7 | 48.0 |
| 165 | 53.9 | 43.2 |
| 170 | 68.1 | 53.3 |
| 175 | 79.5 | 62.0 |
| 180 | 83.0 | 66.5 |
| 185 | 81.4 | 65.5 |
| 190 | 72.6 | 58.2 |
| 195 | 59.2 | 45.2 |
| 200 | 54.6 | 44.3 |
| 205 | 64.3 | 51.1 |
| 210 | 69.3 | 51.6 |
| 215 | 67.8 | 47.3 |
| 220 | 67.6 | 49.8 |
| 225 | 73.5 | 51.0 |
| 230 | 81.6 | 51.5 |
| 235 | 83.7 | 49.2 |
| 240 | 75.5 | 47.0 |
| 245 | 67.4 | 44.7 |

TABLE 3.3-continued interpolation of responses (in amplitude)

| Direction | Internal | External |
|---|---|---|
| 250 | 60.7 | 40.5 |
| 255 | 71.1 | 42.4 |
| 260 | 82.3 | 44.2 |
| 265 | 89.0 | 50.7 |
| 270 | 91.3 | 54.5 |
| 275 | 91.0 | 37.0 |
| 280 | 86.6 | 35.0 |
| 285 | 77.9 | 33.8 |
| 290 | 67.6 | 34.5 |
| 295 | 72.8 | 39.1 |
| 300 | 82.0 | 47.8 |
| 305 | 88.1 | 54.0 |
| 310 | 88.5 | 56.2 |
| 315 | 83.0 | 55.0 |
| 320 | 73.4 | 50.3 |
| 325 | 72.4 | 46.9 |
| 330 | 71.4 | 49.9 |
| 335 | 67.3 | 52.8 |
| 340 | 57.7 | 48.0 |
| 345 | 53.9 | 43.2 |
| 350 | 68.1 | 53.3 |
| 355 | 79.5 | 62.0 |

Annex 4: Regulated Gain Values

TABLE 4.1 absolute values

| Direction | Internal | External |
|---|---|---|
| 0 | 34.7 | 36.6 |
| 5 | 34.8 | 36.7 |
| 10 | 35.8 | 37.8 |
| 15 | 37.6 | 40.0 |
| 20 | 38.3 | 40.1 |
| 25 | 36.9 | 38.9 |
| 30 | 36.3 | 38.8 |
| 35 | 36.4 | 39.6 |
| 40 | 36.5 | 39.1 |
| 45 | 35.7 | 38.9 |
| 50 | 35.1 | 39.2 |
| 55 | 35.2 | 40.0 |
| 60 | 35.6 | 40.8 |
| 65 | 36.6 | 41.6 |
| 70 | 37.5 | 42.9 |
| 75 | 36.1 | 42.9 |
| 80 | 34.8 | 43.0 |
| 85 | 34.1 | 42.2 |
| 90 | 33.9 | 41.9 |
| 95 | 33.9 | 41.7 |
| 100 | 34.3 | 42.2 |
| 105 | 35.2 | 42.5 |
| 110 | 36.5 | 42.3 |
| 115 | 35.8 | 41.2 |
| 120 | 34.8 | 39.5 |
| 125 | 34.2 | 38.4 |
| 130 | 34.1 | 38.1 |
| 135 | 34.7 | 38.3 |
| 140 | 35.7 | 39.0 |
| 145 | 35.9 | 39.6 |
| 150 | 36.0 | 39.1 |
| 155 | 36.5 | 38.6 |
| 160 | 37.8 | 39.4 |
| 165 | 38.4 | 40.3 |
| 170 | 36.4 | 38.5 |
| 175 | 35.1 | 37.2 |
| 180 | 34.7 | 36.6 |
| 185 | 34.8 | 36.7 |
| 190 | 35.8 | 37.8 |
| 195 | 37.6 | 40.0 |
| 200 | 38.3 | 40.1 |
| 205 | 36.9 | 38.9 |
| 210 | 36.3 | 38.8 |

TABLE 4.1-continued absolute values

| Direction | Internal | External |
|---|---|---|
| 215 | 36.4 | 39.6 |
| 220 | 36.5 | 39.1 |
| 225 | 35.7 | 38.9 |
| 230 | 34.8 | 38.8 |
| 235 | 34.6 | 39.2 |
| 240 | 35.5 | 39.6 |
| 245 | 36.5 | 40.0 |
| 250 | 37.4 | 40.9 |
| 255 | 36.0 | 40.5 |
| 260 | 34.8 | 40.2 |
| 265 | 34.1 | 39.0 |
| 270 | 33.9 | 38.3 |
| 275 | 33.9 | 41.7 |
| 280 | 34.3 | 42.2 |
| 285 | 35.2 | 42.5 |
| 290 | 36.5 | 42.3 |
| 295 | 35.8 | 41.2 |
| 300 | 34.8 | 39.5 |
| 305 | 34.2 | 38.4 |
| 310 | 34.1 | 38.1 |
| 315 | 34.7 | 38.3 |
| 320 | 35.7 | 39.0 |
| 325 | 35.9 | 39.6 |
| 330 | 36.0 | 39.1 |
| 335 | 36.5 | 38.6 |
| 340 | 37.8 | 39.4 |
| 345 | 38.4 | 40.3 |
| 350 | 36.4 | 38.5 |
| 355 | 35.1 | 37.2 |

TABLE 4.2 relative values

| Direction | Internal | External |
|---|---|---|
| 0 | 34.7 | 1.9 |
| 5 | 34.8 | 1.9 |
| 10 | 35.8 | 1.9 |
| 15 | 37.6 | 2.3 |
| 20 | 38.3 | 1.8 |
| 25 | 36.9 | 2.0 |
| 30 | 36.3 | 2.6 |
| 35 | 36.4 | 3.1 |
| 40 | 36.5 | 2.7 |
| 45 | 35.7 | 3.2 |
| 50 | 35.1 | 4.1 |
| 55 | 35.2 | 4.9 |
| 60 | 35.6 | 5.2 |
| 65 | 36.6 | 5.1 |
| 70 | 37.5 | 5.4 |
| 75 | 36.1 | 6.8 |
| 80 | 34.8 | 8.1 |
| 85 | 34.1 | 8.0 |
| 90 | 33.9 | 8.0 |
| 95 | 33.9 | 7.8 |
| 100 | 34.3 | 7.9 |
| 105 | 35.2 | 7.3 |
| 110 | 36.5 | 5.8 |
| 115 | 35.8 | 5.4 |
| 120 | 34.8 | 4.7 |
| 125 | 34.2 | 4.2 |
| 130 | 34.1 | 3.9 |
| 135 | 34.7 | 3.6 |
| 140 | 35.7 | 3.3 |
| 145 | 35.9 | 3.8 |
| 150 | 36.0 | 3.1 |
| 155 | 36.5 | 2.1 |
| 160 | 37.8 | 1.6 |
| 165 | 38.4 | 1.9 |
| 170 | 36.4 | 2.1 |
| 175 | 35.1 | 2.2 |
| 180 | 34.7 | 1.9 |

TABLE 4.2-continued

| | relative values | |
|---|---|---|
| Direction | Internal | External |
| 185 | 34.8 | 1.9 |
| 190 | 35.8 | 1.9 |
| 195 | 37.6 | 2.3 |
| 200 | 38.3 | 1.8 |
| 205 | 36.9 | 2.0 |
| 210 | 36.3 | 2.6 |
| 215 | 36.4 | 3.1 |
| 220 | 36.5 | 2.7 |
| 225 | 35.7 | 3.2 |
| 230 | 34.8 | 4.0 |
| 235 | 34.6 | 4.6 |
| 240 | 35.5 | 4.1 |
| 245 | 36.5 | 3.6 |
| 250 | 37.4 | 3.5 |
| 255 | 36.0 | 4.5 |
| 260 | 34.8 | 5.4 |
| 265 | 34.1 | 4.9 |
| 270 | 33.9 | 4.5 |
| 275 | 33.9 | 7.8 |
| 280 | 34.3 | 7.9 |
| 285 | 35.2 | 7.3 |
| 290 | 36.5 | 5.8 |
| 295 | 35.8 | 5.4 |
| 300 | 34.8 | 4.7 |
| 305 | 34.2 | 4.2 |
| 310 | 34.1 | 3.9 |
| 315 | 34.7 | 3.6 |
| 320 | 35.7 | 3.3 |
| 325 | 35.9 | 3.8 |
| 330 | 36.0 | 3.1 |
| 335 | 36.5 | 2.1 |
| 340 | 37.8 | 1.6 |
| 345 | 38.4 | 1.9 |
| 350 | 36.4 | 2.1 |
| 355 | 35.1 | 2.2 |

The invention claimed is:

1. A module to help in calibration of a device for inspection of metallurgical products, comprising:
a memory configured to store data in a form of value/angle pairs, each pair corresponding to an amplitude of response to an ultrasound inspection in a direction of the metallurgical product corresponding to the angle;
a calculator configured to perform a processing function on the stored data;
wherein the data are organized into:
a first set of data involving a polydirectional reflector disposed in the metallurgical product, the pairs of the first set corresponding to amplitudes of response to ultrasound inspections along at least some of working directions of the polydirectional reflector; and
a second set of data involving a directional reflector disposed in the metallurgical product, the second set of data comprising:, for the directional reflector, at least one pair corresponding to an amplitude of response to an ultrasound inspection along one working direction of the reflector; and
wherein the processing function is disposed to establish a third set of data by interpolation of pairs of the first set of data and the second set of data, the pairs of the third set corresponding to standard amplitudes for ultrasound inspections along at least souse of the working directions of the polydirectional reflector.

2. A module according to claim 1, wherein the second set of data concerns plural directional reflectors disposed in the metallurgical product the second set of data comprising, for each directional reflector, at least one pair corresponding to an amplitude of response to an ultrasound inspection along one working direction of this reflector.

3. A module according to claim 1, wherein the processing function is disposed to establish one or more pairs for the second set of data whose respective angles correspond to working directions of the polydirectional reflector, and whose respective amplitude values are calculated from values of pairs corresponding to the first set.

4. A module according to claim 1, wherein at least some of the amplitude values of the third set of data are calculated by interpolation of a comparative amplitude value, values of pairs of the first set of data and amplitude values of pairs of the second set of data having mutually corresponding angles.

5. A module according to claim 1, wherein the interpolation involves a linear regression.

6. A module according to claim 1, wherein the processing function is disposed to establish a value/angle pair of the third set of data for each value/angle pair of the first set of data, the angle of the pair of the third set of data and the angle of the pair of the first set of data corresponding to each other.

7. A module according to claim 1, wherein the polydirectional reflector comprises a boring of regular shape in the metallurgical product.

8. A module according to claim 2, wherein each directional reflector comprises a standardized notch.

9. A module according to claim 1, wherein the processing function further comprises a statistical function disposed to establish a mean amplitude value from amplitude values of pairs whose angles correspond to mutually symmetrical directions, and wherein the processing function calls up this statistical function with the data of at least one of the first set of data and the second set of data.

10. A module according to claim 9, where n the processing function calls up the statistical function prior to the interpolation.

11. A module according to claim 1, wherein the processing function comprises an extraction function configured to operate on a group of values corresponding to amplitudes of response of a directional reflector resulting from successive ultrasound inspections directed, in the metallurgical product, in similar fashion to each other to establish a characteristic amplitude value of the directional reflector, and wherein this characteristic value is established as a threshold value making it possible to obtain at least two successive amplitude values greater than this threshold value.

12. A non-transitory computer readable medium including a computer program to cooperate with a calculation unit to constitute a module according to claim 1.

13. A method to aid in the calibration of an inspection device for metallurgical products, comprising:
saving a first set of data in a form of value/angle pairs, the first set of data concerning a polydirectional reflector disposed in the metallurgical product, the value/angle pairs of the first set of data corresponding to amplitudes of response to ultrasound inspections at least some of the working directions of the polydirectional reflector corresponding to the angle;
saving a second set of data in a form of value/angle pairs, the second set of data concerning a directional reflector disposed in the metallurgical product, the second set of data comprising, for the directional reflector, at least one value/angle pair corresponding to an amplitude of response to an ultrasound inspection along one working direction of the reflector corresponding to the angle;

establishing a third set of data, in a form of value/angle pairs, by interpolation of the pairs of the first set of data and the second set of data, the pairs of the third set corresponding to standard amplitudes for ultrasound inspections along at least some of the working directions of the polydirectional reflector.

* * * * *

UNITED STATES PATENT AND TRADEMARK OFFICE
CERTIFICATE OF CORRECTION

PATENT NO. : 10,690,633 B2
APPLICATION NO. : 15/562665
DATED : June 23, 2020
INVENTOR(S) : Alexandre Noel Page 1 of 1

It is certified that error appears in the above-identified patent and that said Letters Patent is hereby corrected as shown below:

In the Specification

In Column 5, Line 9, delete ""coupant"" and insert -- "couplant" --, therefor.

In Column 13, Line 66 approx., delete "MES_GAIN[J]/" and insert -- MES_GAIN[J])/ --, therefor.

In Column 18, Line 3, delete "CALBR" and insert -- CALIBR --, therefor.

In the Claims

In Column 25, Line 54, Claim 1, delete "comprising:," and insert -- comprising, --, therefor.

In Column 25, Line 62, Claim 1, delete "souse" and insert -- some --, therefor.

In Column 25, Line 66, Claim 2, delete "product" and insert -- product, --, therefor.

In Column 26, Line 36, Claim 10, delete "where n" and insert -- wherein --, therefor.

In Column 26, Line 58, Claim 13, after "inspections" insert -- along --.

Signed and Sealed this
Twentieth Day of October, 2020

Andrei Iancu
*Director of the United States Patent and Trademark Office*